United States Patent
Matsuda

(10) Patent No.: US 9,821,882 B2
(45) Date of Patent: Nov. 21, 2017

(54) ASSEMBLING METHOD AND ASSEMBLING MANAGEMENT METHOD OF ELECTRIC VEHICLE

(71) Applicant: KAWASAKI JUKOGYO KABUSHIKI KAISHA, Kobe-shi, Hyogo (JP)

(72) Inventor: Yoshimoto Matsuda, Kobe (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 171 days.

(21) Appl. No.: 14/433,017

(22) PCT Filed: Jul. 3, 2013

(86) PCT No.: PCT/JP2013/004116
§ 371 (c)(1),
(2) Date: Apr. 1, 2015

(87) PCT Pub. No.: WO2014/054205
PCT Pub. Date: Apr. 10, 2014

(65) Prior Publication Data
US 2015/0251716 A1    Sep. 10, 2015

(30) Foreign Application Priority Data

Oct. 3, 2012  (WO) .................. PCT/JP2012/006333

(51) Int. Cl.
*B62M 7/02*    (2006.01)
*H01M 2/10*    (2006.01)
(Continued)

(52) U.S. Cl.
CPC ................ *B62M 7/02* (2013.01); *B60K 1/04* (2013.01); *B60L 3/0046* (2013.01); *B60L 3/12* (2013.01);
(Continued)

(58) Field of Classification Search
CPC ... G01M 99/005; G01M 17/00; G01M 99/008
See application file for complete search history.

(56) References Cited

U.S. PATENT DOCUMENTS 5,646,534 A    7/1997  Kopera
6,006,944 A *  12/1999 Machledt ............... B65D 88/76
                                                137/493.8
(Continued)

FOREIGN PATENT DOCUMENTS

EP    1389552 A1    2/2004
EP    1786057 A2    5/2007
(Continued)

OTHER PUBLICATIONS

United States Patent and Trademark Office, Office Action Issued in U.S. Appl. No. 14/433,374, Jul. 31, 2015, 11 pages.
(Continued)

*Primary Examiner* — John Walters
*Assistant Examiner* — James Triggs
(74) *Attorney, Agent, or Firm* — Alleman Hall Creasman & Tuttle LLP

(57) ABSTRACT

An assembling method of an electric vehicle comprises the steps of: assembling a vehicle body including a frame, wheels and an electric motor; conducting a vehicle body test including confirmation of a state of driving power transmission from the electric motor to the wheels by connecting an electric power supply unit installed in a vehicle body test place to the electric motor of the vehicle body and supplying electric power from the electric power supply unit to the electric motor; detaching the electric power supply unit from the electric motor and transporting the vehicle body which has passed the vehicle body test from the vehicle body test place to a mounting place, in a state in which a battery is not
(Continued)

mounted to the vehicle body; and mounting the battery to the transported vehicle body in the mounting place.

17 Claims, 5 Drawing Sheets

(51) Int. Cl.
| | |
|---|---|
| H01M 10/48 | (2006.01) |
| B60L 11/18 | (2006.01) |
| B60L 3/00 | (2006.01) |
| B60L 3/12 | (2006.01) |
| B62D 65/00 | (2006.01) |
| G01M 17/007 | (2006.01) |
| B62K 19/30 | (2006.01) |
| B62K 19/34 | (2006.01) |
| H02J 7/00 | (2006.01) |
| B62K 11/04 | (2006.01) |
| B62K 25/28 | (2006.01) |
| B60K 1/04 | (2006.01) |

(52) U.S. Cl.
CPC ....... *B60L 11/1803* (2013.01); *B60L 11/1816* (2013.01); *B60L 11/1818* (2013.01); *B60L 11/1822* (2013.01); *B60L 11/1859* (2013.01); *B60L 11/1861* (2013.01); *B60L 11/1868* (2013.01); *B60L 11/1877* (2013.01); *B60L 11/1879* (2013.01); *B62D 65/005* (2013.01); *B62K 11/04* (2013.01); *B62K 19/30* (2013.01); *B62K 19/34* (2013.01); *B62K 25/283* (2013.01); *G01M 17/007* (2013.01); *H01M 2/1072* (2013.01); *H01M 2/1083* (2013.01); *H01M 10/48* (2013.01); *H02J 7/0022* (2013.01); *B60K 2001/0455* (2013.01); *B60K 2001/0461* (2013.01); *B60L 2200/12* (2013.01); *B60L 2230/10* (2013.01); *B60L 2230/16* (2013.01); *B60L 2240/545* (2013.01); *B60L 2270/40* (2013.01); *B60Y 2200/12* (2013.01); *B62K 2204/00* (2013.01); *B62K 2208/00* (2013.01); *H01M 2220/20* (2013.01); *Y02T 10/7005* (2013.01); *Y02T 10/7044* (2013.01); *Y02T 10/7066* (2013.01); *Y02T 10/7088* (2013.01); *Y02T 90/124* (2013.01); *Y02T 90/128* (2013.01); *Y02T 90/14* (2013.01); *Y02T 90/163* (2013.01); *Y10T 29/49004* (2015.01); *Y10T 29/49108* (2015.01); *Y10T 29/49117* (2015.01)

(56) References Cited

U.S. PATENT DOCUMENTS

| | | | |
|---|---|---|---|
| 9,308,966 | B2 | 4/2016 | Kosuge et al. |
| 2003/0094324 | A1 | 5/2003 | Huang |
| 2006/0255755 | A1 | 11/2006 | Shu et al. |
| 2007/0247106 | A1* | 10/2007 | Kawahara ............ B60L 3/0046 320/104 |
| 2009/0255747 | A1 | 10/2009 | Kasaba et al. |
| 2010/0078247 | A1 | 4/2010 | Sasage et al. |
| 2010/0230188 | A1 | 9/2010 | Nguyen |
| 2011/0012604 | A1 | 1/2011 | Tsujiko et al. |
| 2011/0066309 | A1 | 3/2011 | Matsuoka et al. |
| 2011/0144844 | A1 | 6/2011 | Ishibashi |
| 2011/0259660 | A1 | 10/2011 | Johnson et al. |
| 2012/0013180 | A1 | 1/2012 | Muto et al. |
| 2012/0015221 | A1 | 1/2012 | Murase et al. |
| 2012/0118659 | A1 | 5/2012 | Shinde et al. |
| 2012/0119749 | A1 | 5/2012 | Iida |
| 2013/0032427 | A1 | 2/2013 | Ishikawa et al. |
| 2013/0110340 | A1 | 5/2013 | Park et al. |
| 2013/0264134 | A1 | 10/2013 | Matsuda |
| 2013/0299265 | A1 | 11/2013 | Marazzi |
| 2014/0091751 | A1 | 4/2014 | Workman et al. |
| 2015/0251540 | A1 | 9/2015 | Matsuda |
| 2015/0280467 | A1 | 10/2015 | Matsuda |

FOREIGN PATENT DOCUMENTS

| | | | |
|---|---|---|---|
| EP | 2479069 | A1 | 7/2012 |
| EP | 2479091 | A1 | 7/2012 |
| JP | S58004326 | A | 1/1983 |
| JP | H03281490 | A | 12/1991 |
| JP | H04201687 | A | 7/1992 |
| JP | H08058656 | A | 3/1996 |
| JP | H09163620 | A | 6/1997 |
| JP | 2000115902 | A | 4/2000 |
| JP | 2001138976 | A | 5/2001 |
| JP | 2002025631 | A | 1/2002 |
| JP | 2002240765 | A | 8/2002 |
| JP | 2002268913 | A | 9/2002 |
| JP | 2003127941 | A | 5/2003 |
| JP | 2003182669 | A | 7/2003 |
| JP | 2003189539 | A | 7/2003 |
| JP | 2003267278 | A | 9/2003 |
| JP | 2004362949 | A | 12/2004 |
| JP | 2006205894 | A | 8/2006 |
| JP | 2007083953 | A | 4/2007 |
| JP | 2008104257 | A | 5/2008 |
| JP | 2009165210 | A | 7/2009 |
| JP | 2009283457 | A | 12/2009 |
| JP | 2010022155 | A | 1/2010 |
| JP | 2010080135 | A | 4/2010 |
| JP | 2010083332 | A | 4/2010 |
| JP | 2010100124 | A | 5/2010 |
| JP | 2010208382 | A | 9/2010 |
| JP | 2010239705 | A | 10/2010 |
| JP | 2011076903 | A | 4/2011 |
| JP | 2011160567 | A | 8/2011 |
| JP | 2012050272 | A | 3/2012 |
| JP | 2012060705 | A | 3/2012 |
| JP | 2012068887 | A | 4/2012 |
| JP | 2012131414 | A | 7/2012 |
| JP | 2012144178 | A | 8/2012 |
| JP | 2013147153 | A | 8/2013 |
| WO | 2012014968 | A1 | 2/2012 |
| WO | 2012032621 | A1 | 3/2012 |
| WO | 2012063292 | A1 | 5/2012 |
| WO | 2012070109 | A1 | 5/2012 |
| WO | 2012104592 | A1 | 8/2012 |

OTHER PUBLICATIONS

European Patent Office, Extended European Search Report Issued in Application No. 13843645.6, Apr. 22, 2016, 8 pages.
Roussely, M. et al., "Main aging mechanisms in Li ion batteries," Journal of Power Sources, vol. 146, No. 1-2, Aug. 2005, Available Online May 31, 2005, 7 pages.
European Patent Office, Extended European Search Report Issued in Application No. 13843610.0, May 13, 2016, 12 pages.
European Patent Office, Extended European Search Report Issued in Application No. 12886007.9, Jun. 3, 2016, 10 pages.
European Patent Office, Extended European Search Report Issued in Application No. 13844155.5, Jun. 9, 2016, 11 pages.
ISA Japanese Patent Office, International Search Report Issued in Japanese Patent Application PCT/JP2012/006333, Jan. 15, 2013, WIPO, 2 pages.
ISA Japanese Patent Office, International Search Report Issued in Japanese Patent Application PCT/JP2013/004115, Sep. 3, 2013, WIPO, 2 pages.
ISA Japanese Patent Office, International Search Report Issued in Japanese Patent Application PCT/JP2013/004116, Oct. 1, 2013, WIPO, 2 pages.
ISA Japanese Patent Office, International Search Report Issued in Japanese Patent Application PCT/JP2013/004117, Oct. 1, 2013, WIPO, 2 pages.

(56) References Cited

OTHER PUBLICATIONS

European Patent Office, Office Action Issued in Application No. 12886007.9, dated May 15, 2017, Netherlands, 8 pages.

* cited by examiner

ASSEMBLING METHOD AND ASSEMBLING MANAGEMENT METHOD OF ELECTRIC VEHICLE

TECHNICAL FIELD

The present invention relates to an assembling method and an assembling management method of an electric vehicle in which a battery is mounted to a vehicle body.

BACKGROUND ART

An electric vehicle is required to incorporate a battery as an electric power supply for an electric motor which rotates a wheel. Patent Literature 1 discloses a charging method in which a charger is connected to a battery all the time during storage of the vehicle because the SOC (state of charge) of the battery is reduced by self-discharge in a state in which the battery is not used and left alone. In the charging method disclosed in Patent Literature 1, the charger is connected to the battery in a state in which the battery is mounted to the vehicle body.

CITATION LIST

Patent Literature

Patent Literature 1: Japanese Laid-Open Patent Application Publication No. Hei. 9-163620

SUMMARY OF INVENTION

Technical Problem

Conventionally, prior to the sale of a vehicle incorporating an engine, the vehicle in an assembled state is tested, and the vehicle which has passed many tests is treated as a commercial product for sale. This product is treated as a stock product in a vehicle factory or a retailer for a period of time after the tests are finished until the product is handed over to a customer. During the storage of the stock product, regular maintenance is not particularly performed for the stock product. In shipment from the factory, vehicle functions and essential security components (e.g., brakes, lamps, signals, and meters) are tested. The battery is required to be replaceable while maintaining this confirmation state.

The battery discharges by itself in a state in which it is left alone. Excess discharge of the battery significantly degrades the quality of the battery. Or, in a case where the ambient temperature of the battery is high, this also significantly degrades the quality of the battery. If the electric vehicle in the assembled state is treated as the stock product like the vehicle incorporating the engine after the test is finished until the product is handed over to the customer, the quality of the battery is likely to be degraded. When the battery is charged by the method disclosed in Patent Literature 1 to prevent the degradation of the quality of the battery during the storage of the stock product, stock management (control) of the electric vehicle becomes complex.

An object of the present invention is to easily perform stock management of the electric vehicle.

Solution to Problem

According to the present invention, there is provided an assembling method of an electric vehicle in which a battery as an electric power supply for an electric motor which generates a driving power transmitted to wheels is mounted to a vehicle body including a frame, the wheels, and the electric motor, the assembling method comprising the steps of: assembling the vehicle body; conducting a vehicle body test including confirmation of a state of driving power transmission from the electric motor to the wheels by connecting an electric power supply unit installed in a vehicle body test place to the electric motor of the vehicle body and supplying electric power from the electric power supply unit to the electric motor; detaching the electric power supply unit from the electric motor and transporting the vehicle body which has passed the vehicle body test from the vehicle body test place to a mounting place, in a state in which the battery is not mounted to the vehicle body; and mounting the battery to the transported vehicle body, in the mounting place.

In accordance with this configuration, during the test of the vehicle body and after the test of the vehicle body, a state in which battery is not mounted to the vehicle body can be maintained. This makes it possible to retard the timing at which the battery is mounted to the vehicle body. Therefore, the battery can be managed easily, and the degradation of the battery can be prevented.

The assembling method of the electric vehicle may comprise the step of storing the battery and the vehicle body to which the battery is not mounted, for a period that passes until the vehicle body is transported from the vehicle body test place to the mounting place, in the step of transporting the vehicle body; wherein in the step of storing the battery and the vehicle body, the battery and the vehicle body may be stored separately, and a temperature of the battery may be controlled. The battery is more likely to be degraded due to the influence of an ambient environment than the vehicle body is. In accordance with the above configuration, for a period during which the battery is not mounted to the vehicle body yet, the battery is stored separately from the vehicle body and its temperature is controlled. Therefore, the degradation of the battery can be prevented. During the storage of the vehicle body, it is not necessary to control the temperature of the vehicle body, unlike the battery. As a result, total storage cost of the vehicle body and the battery can be reduced.

In the step of storing the battery and the vehicle body, the battery may be re-charged or tested. In accordance with this configuration, the degradation of the battery can be prevented with a simple management method.

In the step of mounting the battery to the transported vehicle body, the battery which is re-charged or the battery which has a good test result in the step of storing the battery and the vehicle body, may be mounted to the vehicle body.

In the step of mounting the battery to the transported vehicle body, it may be determined whether or not the battery is permitted to be mounted to the vehicle body, based on vehicle body identification information provided to the vehicle body and battery identification information provided to the battery, according to a predetermined rule. In accordance with this configuration, it becomes possible to prevent a situation in which a finished vehicle including an unfavorable battery and an unfavorable vehicle body is provided to the customer.

The assembling method of the electric vehicle may comprise the step of: detecting a state of the battery before the step of mounting the battery to the transported vehicle body, and in the step of mounting the battery to the transported vehicle body, it may be determined whether or not the battery is permitted to be mounted to the vehicle body, based on a result of detection in the step of detecting the state of the battery. In accordance with this configuration, it becomes possible to reduce time that passes from when the battery is mounted to the vehicle body until the battery is fully charged by the customer, which is advantageous to the customer.

The step of mounting the battery to the transported vehicle body may be performed in a place which is closer to a location where the electric vehicle is provided to a user, than the vehicle body test place is. In accordance with this configuration, it becomes possible to delay the timing at which the battery is mounted to the vehicle body. Therefore, the degradation of the battery can be prevented easily.

The electric vehicle may be a straddle-type vehicle. Since the straddle-type vehicle is small and lightweight, the vehicle body can be moved easily by hand in the state in which the battery is not mounted to the vehicle body yet. Because of this, even when the battery is mounted to the vehicle body at a later timing, an operation burden is lessened.

According to the present invention, there is provided an assembling management method of an electric vehicle in which a battery as an electric power supply for an electric motor which generates a driving power transmitted to wheels is mounted to a vehicle body including a frame, the wheels, and the electric motor, the assembling management method comprising the steps of: assembling the vehicle body; conducting a vehicle body test including confirmation of a state of driving power transmission from the electric motor to the wheels by connecting an electric power supply unit installed in a vehicle body test place to the electric motor of the vehicle body and supplying electric power from the electric power supply unit to the electric motor; and detaching the electric power supply unit from the electric motor and transporting the vehicle body which has passed the vehicle body test from the vehicle body test place, in a state in which the battery is not mounted to the vehicle body.

The assembling management method of the electric vehicle may comprise the step of storing the battery and the vehicle body transported in the step of transporting the vehicle body; wherein in the step of storing the battery and the vehicle body, the battery may be stored in a battery storage room isolated from a vehicle body storage area in which the vehicle body is stored, and a temperature of the battery storage room may be adjusted to fall into a predetermined range.

The assembling management method of the electric vehicle may comprise the step of: storing the battery and the vehicle body transported in the step of transporting the vehicle body; wherein in the step of storing the battery and the vehicle body, the battery may be re-charged or tested.

According to the present invention, there is provided an assembling management method of an electric vehicle in which a battery as an electric power supply for an electric motor which generates a driving power transmitted to wheels is mounted to a vehicle body including a frame, the wheels, and the electric motor, the assembling management method comprising the steps of: preparing the vehicle body which has passed a vehicle body test conducted in a state in which the battery is not mounted to the vehicle body; preparing the battery; storing the battery and the vehicle body for at least a portion of a stand-by period that passes until the battery is mounted to the vehicle body; and transferring the battery and the vehicle body to a place where the battery is mounted to the vehicle body, after the step of storing the battery and the vehicle body; wherein in the step of storing the battery and the vehicle body, the battery is stored in a battery storage room isolated from a vehicle body storage area in which the vehicle body is stored, and a temperature of the battery storage room is adjusted to fall into a predetermined range.

Advantageous Effects of Invention

According to the present invention, the stock management of the electric vehicle can be easily performed.

DESCRIPTION OF EMBODIMENTS

Hereinafter, the embodiment of the present invention will be described with reference to the accompanying drawings. Hereinafter, the stated directions are referenced from the perspective of a rider riding an electric motorcycle which is an example of an electric vehicle. A vehicle length direction corresponds to a forward and rearward direction, and a vehicle width direction corresponds to a rightward and leftward direction.

Figure 1:
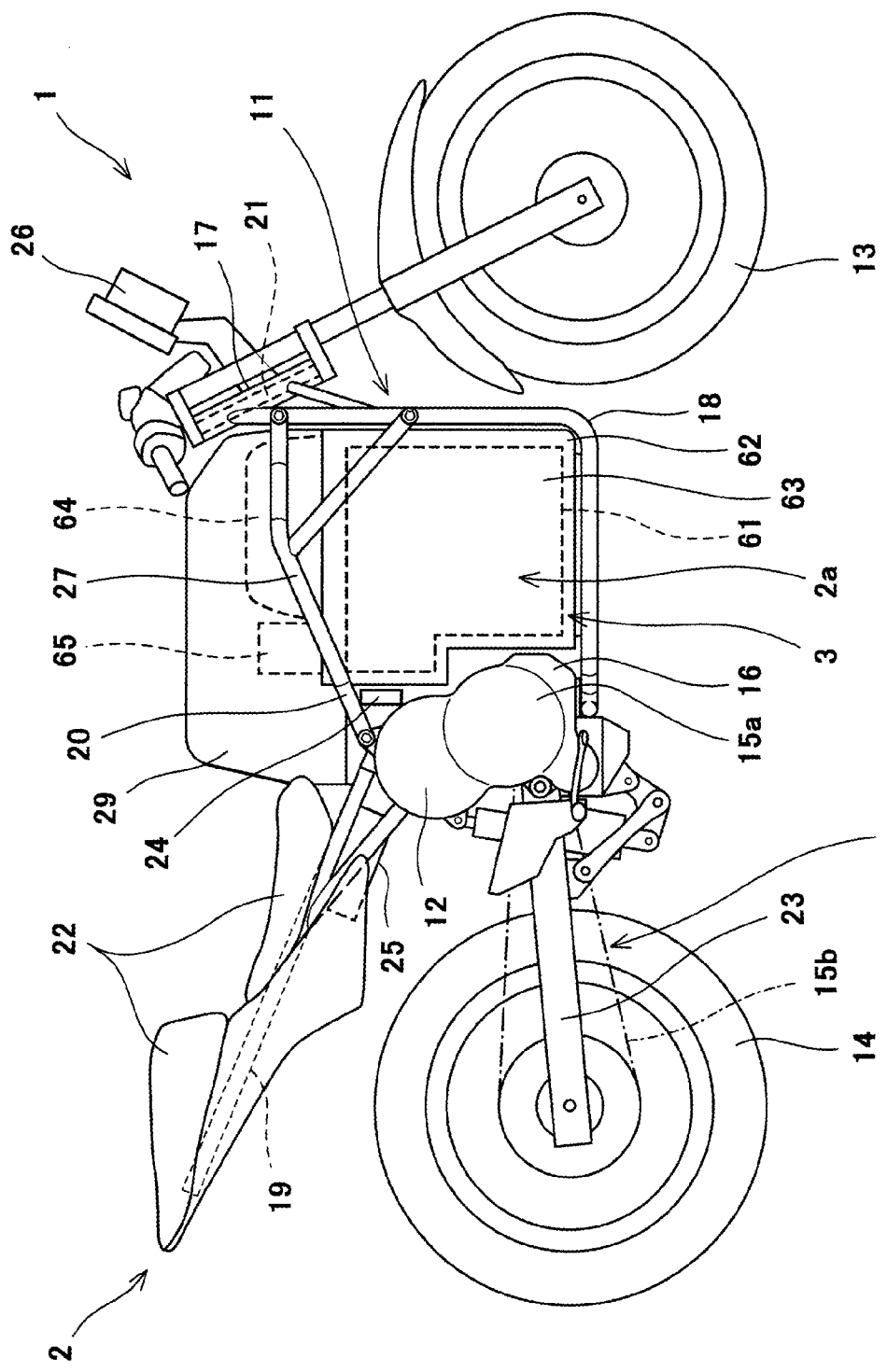
FIG. 1 is a right side view of an electric motorcycle according to an embodiment.
Figure 2:
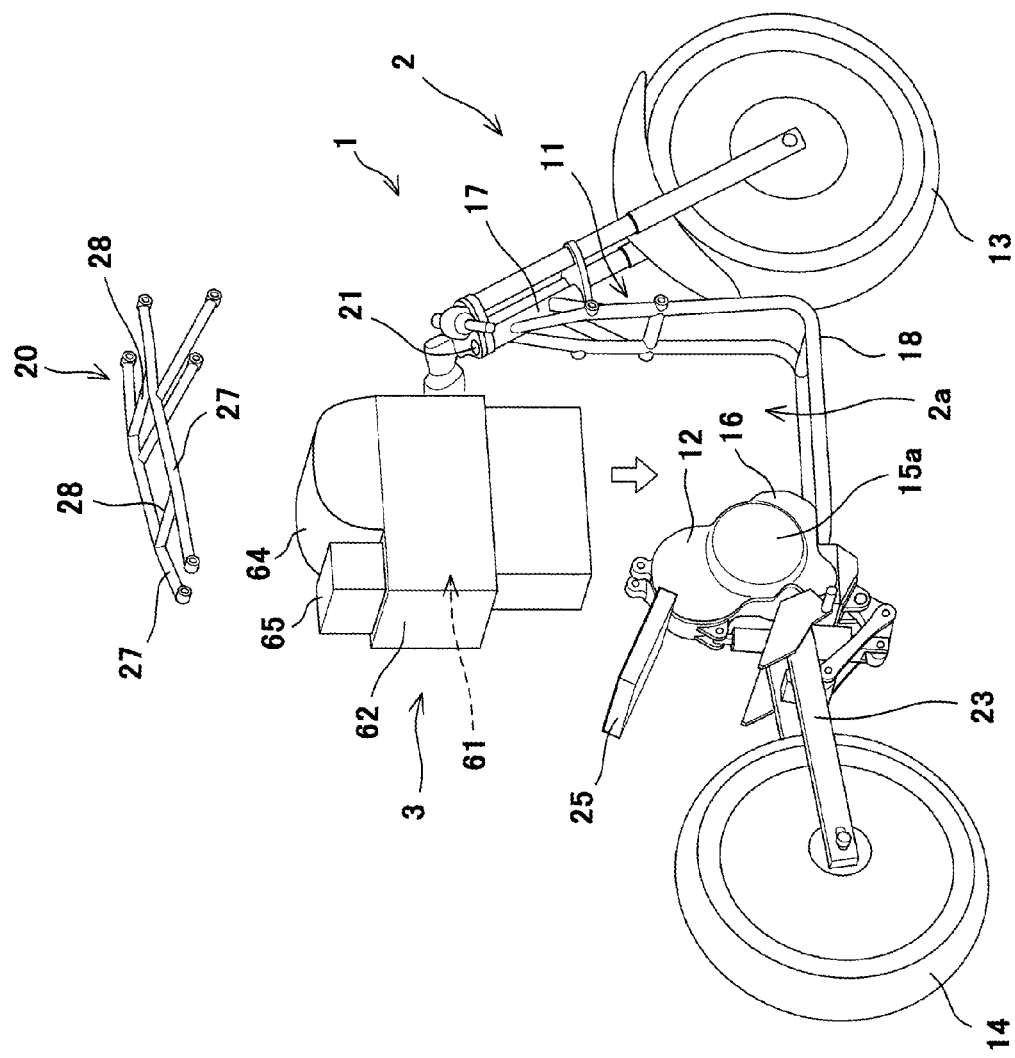
FIG. 2 is an exploded perspective view of the electric motorcycle of FIG. 1.

FIG. 1 is a right side view of an electric motorcycle 1 according to the embodiment. FIG. 2 is an exploded perspective view of the electric motorcycle 1 of FIG. 1. As shown in FIGS. 1 and 2, the electric motorcycle 1 includes a vehicle body 2 and a battery unit 3. The battery unit 3 is removably mounted to the vehicle body 2. The battery unit 3 is smaller in size than the vehicle body 2. Specifically, the dimension of the battery unit 3 in the forward and rearward direction, the dimension of the battery unit 3 in a vertical direction, and the dimension of the battery unit 3 in the rightward and leftward direction, are smaller than the dimension of the vehicle body 2 in the forward and rearward direction, the dimension of the vehicle body 2 in the vertical direction, and the dimension of the vehicle body 2 in the rightward and leftward direction, respectively.

As shown in FIG. 1, the vehicle body 2 includes a vehicle body frame 11, wheels, and an electric motor 12 for generating a driving power transmitted to the wheels to move the vehicle body 2. In the present embodiment, the wheels include one front wheel 13 which is a driven wheel and a steering wheel, and one rear wheel 14 which is a drive wheel. A driving power generated in the electric motor 12 is transmitted to the rear wheel 14 via a driving power transmission mechanism 15. The driving power transmission mechanism 15 includes a transmission 15a which changes the speed of the rotation of the electric motor 12, and a mechanism 15b (e.g., chain transmission mechanism, belt transmission mechanism, and others) which transmits the rotational power output from the transmission 15a to the axle of the rear wheel 14. The electric motor 12 and the transmission 15a are stored in a motor unit case 16.

The vehicle body frame 11 includes a head pipe 17, a main frame 18, a seat frame 19, and a sub-frame 20. The head pipe 17 supports a steering shaft 21 such that the steering shaft 21 is rotatable. In the present embodiment, the main frame 18 extends downward from the head pipe 17, is bent and then extends rearward. A seat frame 19 supports a seat 22 on which the rider and a passenger are seated. In the present embodiment, for example, the motor unit case 16 constitutes a portion of the vehicle body frame 11, the main frame 18 is coupled at its rear end portion to the lower front portion of the motor unit case 16, a swing arm 23 is pivotally mounted to the motor unit case 16, and the seat frame 19 extends rearward from the upper portion of the motor unit case 16.

The vehicle body 2 includes electric components (e.g., instrument panel, controller, lamps such as head lamp and brake lamp) activated at lower voltages than the electric motor 12 is, and a low-voltage battery 24 as an electric power supply for the electric components. The low-voltage battery 24 is separated from the battery unit 3. The vehicle body 2 includes an inverter 25 which converts DC power discharged from the battery unit 3 into AC power, and a vehicle control unit 26 which controls the switching operation of the inverter 25. The electric motor 12 operates with the AC power supplied from the inverter 25 to generate the driving power for moving the vehicle body 2. The vehicle control unit 26 controls the inverter 25 in response to the rider's request and vehicle states, such as the operation amount of an accelerator member operated by the rider, the rotational speed of the electric motor 12, or the state of battery 61, to thereby control the operation of the electric motor 12 so that driving control corresponding to the rider's request and the vehicle state can be performed. To realize such driving control, the vehicle body 2 includes a plurality of sensors which detect the rider's request and the vehicle state.

Although in the present embodiment, the motor unit case 16 constitutes a portion of the vehicle body frame 11, the motor unit case 16 may be separate from the vehicle body frame 11. For example, the main frame 18, the seat frame 19 and the swing arm 23 may be joined to a pivot bracket, and the motor unit case 16 may be mounted to the pivot bracket. In the present embodiment, the low-voltage battery 24 may be mounted to the front portion of the motor unit case 16, the inverter 25 is mounted to the seat frame 19, and the vehicle control unit 26 is mounted to the head pipe 17. The mounting structure and layout of these devices may be modified. Other mounting structures and layouts of these devices 24 to 26 may be used so long as the devices 24 to 26 are separate from the battery unit 3 and constitute the vehicle body 2.

The vehicle body 2 has a storage space 2a for storing the battery unit 3, between the front wheel 13 and the rear wheel 14. More specifically, the storage space 2a is provided rearward relative to the head pipe 17 and forward relative to the motor unit case 16. In the present embodiment, for example, the battery unit 3 (battery unit case 62) is mounted onto a portion of the main frame 18, which portion extends in the vehicle length direction.

The sub-frame 20 includes right and left upper frames 27. The upper frames 27 extend in the vehicle length direction in locations which are outward in the vehicle width direction relative to the battery unit 3 mounted onto the main frame 18, and define the outer edge of the storage space 2a, in the vehicle width direction. This allows the sub-frame 20 to protect the battery unit 3 in the vehicle width direction. A side cowling (not shown) covers a portion of the side surface of the battery unit 3, which is below the sub-frame 20, from outside in the vehicle width direction, and an upper cover 29 (see FIG. 1) covers the battery unit 3 from above. In this way, the battery unit 3 is protected from outside by the side cowling and the upper cover 29.

As shown in FIG. 2, the sub-frame 20 is detachably joined to the remaining portion of the vehicle body frame 11 by using, for example, fastening members (not shown) such as bolts. Specifically, the right and left upper frames 27 are detachably joined at their front end portions to the main frame 18 and detachably joined at their rear end portions to the upper portion of the motor unit case 16. Alternatively, the front end portions of the right and left upper frames 27 may be joined to the head pipe 17. Therefore, by detaching the sub-frame 20 from the remaining portion of the vehicle body frame 11, when the battery unit 3 is mounted to the vehicle body, the storage space 2a can be widely opened in the vehicle width direction and in an upward direction. This makes it possible to easily carry out a mounting operation.

Although in the present embodiment, the right and left upper frames 27 are unitarily detachably joined to the remaining portion of the vehicle body frame 11 in the vehicle width direction, via a cross frame 28, one of the right and left upper frames 27 may be integrated with the head pipe 17. In this case, also, one side in the vehicle width direction can be widely opened, when the battery unit 3 is mounted to the vehicle body 2. This also makes it possible to easily carry out a mounting operation. Although in the present embodiment, the main frame 18 has a portion extending in the vehicle length direction in a relatively low location, and the bottom portion of the battery unit 3 is mounted to the portion extending in the vehicle length direction, the battery unit 3 may be mounted to the right and left upper frames 27. In this case, at least the portion extending in the vehicle length direction may be omitted from the main frame 18. In addition, in this case, the battery unit 3 may contain a cross member coupling the battery unit 3 to the right and left upper frames 27 at fastened positions, in the vehicle width direction. This allows the battery unit 3 to reinforce the vehicle body frame 11.

The battery unit 3 includes a battery 61 as an electric power supply for the electric motor 12, and a battery unit case 62 for storing the battery 61. The battery 61 is able to store the DC power. The battery unit case 62 includes a battery storage section 63 for storing the battery 61, and an electric component storage section 64 for storing the electric components which are different from the battery 61. The electric component storage section 64 is placed on the upper portion of the battery storage section 63. The battery unit 3 includes a charging connector 65 used to charge the battery 61. In the present embodiment, for example, the charging connector 65 is placed on the upper portion of the battery storage section 63 and rearward relative to the electric component storage section 64. Since the charging connector 65 is mounted outside the battery unit case 62, the charging connector 65 is easily accessible and a charging operation can be carried out easily, in a case where the battery unit 3 is independent of the vehicle body 2.

Figure 3:
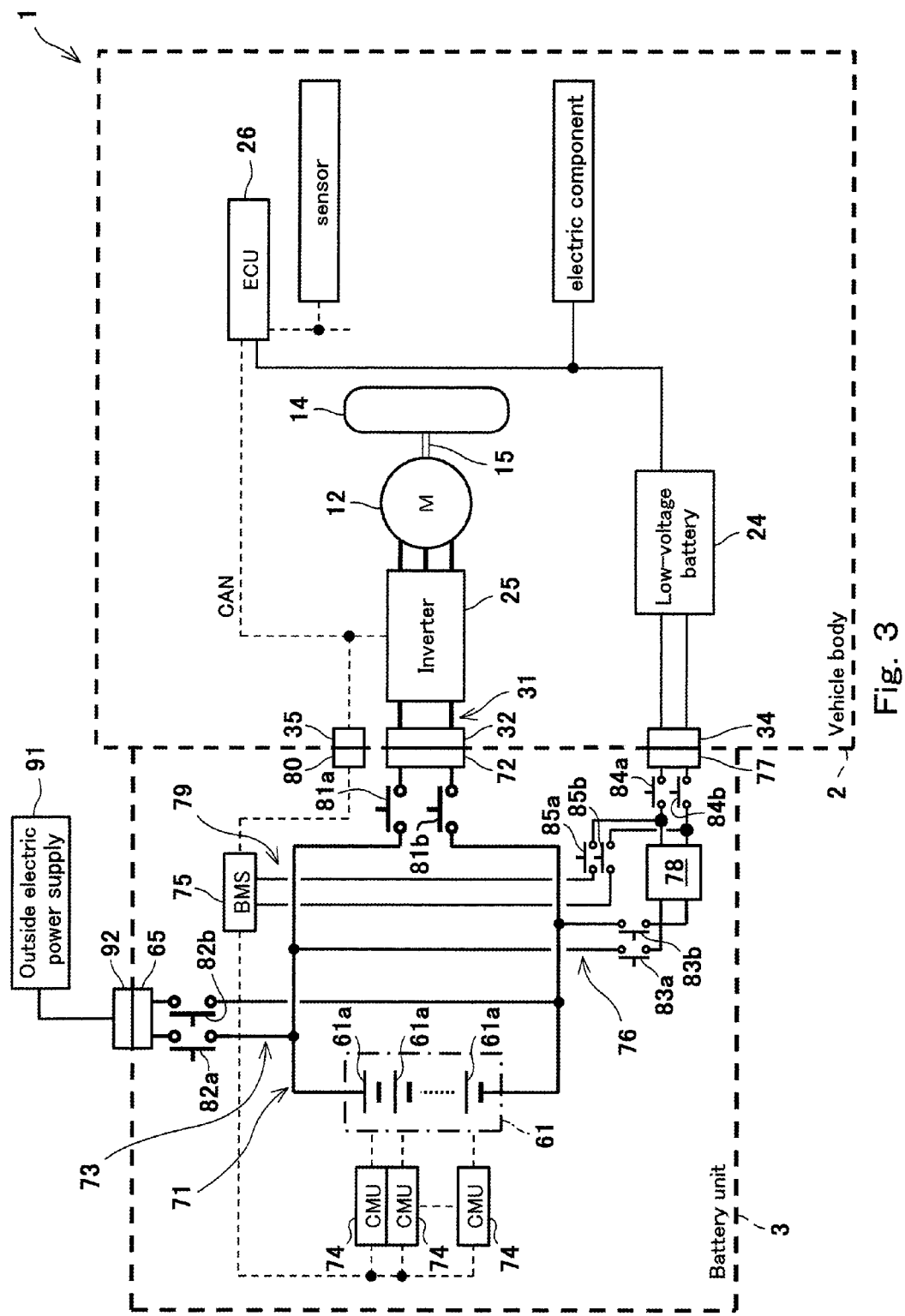
FIG. 3 is a block diagram showing the electric configuration of the electric motorcycle of FIG. 1.

FIG. 3 is a block diagram showing the electric configuration of the electric motorcycle 1 of FIG. 1. As shown in FIG. 3, the vehicle body 2 includes the electric motor 12, the rear wheel 14, the driving power transmission mechanism 15, the inverter 25, and the vehicle control unit 26, as described above. The inverter 25 is mechanically and electrically connected to a vehicle body power supply connector 32 via a wire 31 through which a DC current flows. The battery 61 includes, for example, series connection of a plurality of battery cells 61a, which can make the voltage of the whole battery 61 become a high-voltage which is suitable for activation of the electric motor 12. The battery cells 61a are a secondary battery which can be charged and discharged repeatedly, and for example, lithium ion battery. The battery 61 is more likely to be degraded than the low-voltage battery 24 is, due to the influence of a storage environment. The battery 61 is connected to a battery power supply connector 72 via a wire 71. The connectors 32, 72 are mechanically and electrically connected to each other and thereby the battery 61 is electrically connected to the inverter 25.

The battery 61 is connected to the charging connector 65 via the wire 71 and a wire 73 connected to the wire 71. The charging connector 65 is connectable to an outside charging connector 92 connected to an outside electric power supply 91. When the charging connector 65 is connected to the outside charging connector 92, the battery 61 can be charged with the electric power supplied from the outside electric power supply 91. The charging connector 65 may be used in a charging operation for preventing the degradation of the quality of the battery for a period during which the battery unit 3 detached from the vehicle body 2 is stored, as will be described later.

The battery unit 3 includes cell monitoring units 74 corresponding to the plurality of battery cells 61a, respectively, which are all stored in the battery unit case 62. The cell monitoring units 74 monitor the temperatures and the SOCs of the corresponding battery cells 61a, respectively. The battery unit 3 includes a battery monitoring unit 75 which is communicatively connected to the cell monitoring units 74 and monitors the states of the battery 61 (e.g., the SOC and temperature of the battery 61). The battery monitoring unit 75 is also stored in the battery unit case 62.

The vehicle body 2 is provided with an input connector 34 which is electrically connected to the low-voltage battery 24. The battery unit 3 includes an output connector 77 connected to the battery 61 via the wire 71 and a wire 76 connected to the wire 71, and a voltage decrease circuit 78 which is provided on the wire 76 and decreases the voltage of the battery 61. In a state in which the connectors 34 and 77 are mechanically and electrically connected to each other, the voltage decrease circuit 78 decreases the voltage of the electric power stored in the battery 61, and the low-voltage battery 24 can be charged with this electric power.

The voltage decrease circuit 78 is connected to the battery monitoring unit 75 via the wire 76 and a wire 79 connected to the wire 76. Even when the battery monitoring unit 75 is an electric component activated at a lower voltage than the electric motor 12 is, the battery monitoring unit 75 can operate with the electric power supplied from the battery 61. Specifically, even in a state in which the battery unit 3 is not mounted to the vehicle body 2 and the battery monitoring unit 75 is electrically isolated from the low-voltage battery 24, the battery monitoring unit 75 can operate.

The battery monitoring unit 75 is a controller provided in the battery unit 3 and is able to estimate the SOC of the battery 61 or determine whether or not a failure has occurred in each of the battery cells 61a, based on the information received from the corresponding cell monitoring unit 74. The battery monitoring unit 75 includes a memory and a CPU (central processing unit), which can execute the above processing, and store programs used to execute the above processing.

The battery monitoring unit 75 is communicatively connected to the vehicle control unit 26. The battery monitoring unit 75 is communicatively connected to a battery communication connector 80. The vehicle control unit 26 is communicatively connected to a vehicle body communication connector 35. In a state in which the connectors 35, 80 are mechanically and electrically connected to each other, the information can be bidirectionally transmitted between the battery monitoring unit 75 and the vehicle control unit 26.

The battery monitoring unit 75 is able to control, for example, the operation of the electric components of the battery unit 3, as well as monitoring of the state of the battery 61. The battery monitoring unit 75 may control opening or closing of relays provided on the battery unit 3. The relays include relays 81a, 81b for opening or closing the wire 71, relays 82a, 82b for opening or closing the wire 73, relays 83a, 83b for opening or closing a portion of the wire 76, which portion is closer to the battery 61 than the voltage decrease circuit 78 is, relays 84a, 84b for opening or closing a portion of the wire 76, which portion is closer to the connector 77 than the connection point of the wire 76 with the wire 79 is, and relays 85a, 85b for opening or closing the wire 79. For example, the battery monitoring unit 75 may open the relays 81a, 81b and close the relays 82a, 82b, 83a, 83b during the charging in the state in which the battery unit 3 is mounted to the vehicle body 2.

The vehicle control unit 26 is communicatively connected to the sensors which detect the rider's requests and vehicle states. The vehicle states include the state of the battery 61. In this case, the sensors include the battery monitoring unit 75 and the cell monitoring units 74 connected to the battery monitoring unit 75. The vehicle control unit 26 is communicatively connected to the inverter 25 via a communication means such as CAN (controller area network), etc. The vehicle control unit 26 controls the switching operation of the inverter 25 based on the signals received from the sensors and controls the operation of the electric motor 12 via the control of the inverter 25.

In the electric motorcycle 1 including the vehicle body 2 and the battery unit 3 configured as described above, the vehicle body 2 and the battery unit 3 are initially separately manufactured, the battery unit 3 is accommodated into the storage space 2a of the vehicle body 2, the connectors 72, 77, 80 mounted to the battery unit 3 are mechanically and electrically connected to the corresponding connectors 32, 34, 35 mounted to the vehicle body 2, respectively. After that, the side cowling (not shown), the upper cover 29, and the like are mounted to the vehicle body 2. Thereby, the electric motorcycle 1 is completed.

The electric motorcycle 1 includes the vehicle body 2 including the wheels 13, 14, and the electric motor 12 which rotates the wheels 13, 14, and a battery pack (corresponding to the battery unit 3 as described above) mounted to the vehicle body 2. The vehicle body 2 includes a vehicle body power supply connector 32 for supplying the electric power to the electric motor 12, and the vehicle control unit 26 which controls the electric motor 12, and can drive with the electric power supplied from the vehicle body power supply connector 32 to the electric motor 12. The battery pack includes a casing (corresponding to the above battery unit case 62) which is removably mounted to the vehicle body 2, and the battery 61 which is stored in the casing and serves as the electric power supply for the electric motor 12. The battery pack further includes a driving power supply connector (corresponding to the above battery power supply connector 72), a storage charging connector (corresponding to the above charging connector 65), and the battery monitoring unit 75. The driving power supply connector is mounted to the casing, electrically connected to the battery 61 and electrically connected to the vehicle body power supply connector 32 in a state in which the casing is mounted to the vehicle body 2. The storage charging connector is mounted to the casing and placed at a location which is different from the location of the driving power supply connector, electrically connected to the battery 61 and electrically connected to the outside electric power supply 91. The battery monitoring unit 75 is stored in the casing and configured to monitor the state of the battery 61.

In accordance with this configuration, even in the state in which the battery pack is detached from the vehicle body 2, the outside electric power supply (e.g., power supply unit 101 as will be described later) is connected to the vehicle body power supply connector 32 to supply the electric power to the electric motor 12, thereby allowing the vehicle body 2 to drive. Therefore, even in the state in which the battery pack is detached from the vehicle body 2, bench check of driving can be conducted in a state in which the vehicle control unit 26 is operated. The storage charging connector is mounted to the casing, and the battery monitoring unit 75 is stored in the casing. By using the connector and the unit, a charging/discharging test of the battery 61 can be conducted in the state in which the battery 61 is stored in the battery pack.

During the stock, the battery pack and the vehicle body 2 can be stored (kept in place) independently of each other. By connecting the outside electric power supply 91 to the storage charging connector, the battery 61 can be charged even in the state in which the battery pack is detached from the vehicle body 2. Since the charging operation can be performed for the single battery pack without relation to the vehicle body 2, the stock management of the battery pack can be easily performed.

The storage charging connector is used to charge the battery 61 during a stock period. By comparison, the driving power supply connector is used to supply the electric power from the battery 61 to the electric motor 12 in the state in which the battery pack is mounted to the vehicle body 2. Since the storage charging connector and the driving power supply connector are individually prepared and placed at different locations, these connectors can be placed to be suitable for the storage state of the battery pack and the state of mounting of the battery pack to the vehicle body 2, respectively. For example, the storage charging connector can be placed at a location where the storage charging connector is easily accessible during the storage of the battery pack, while the driving power supply connector can be placed at a location where the driving power supply connector is easily connected to the vehicle body power supply connector in the state in which the battery pack is mounted to the vehicle body. This makes it possible to easily perform the stock management (control) and easily mount the battery pack to the vehicle body 2.

The storage charging connector may be placed such that it is electrically connectable to the outside electric power supply 91 in the state in which the casing is mounted to the vehicle body 2. In accordance with this configuration, the storage charging connector can be used as the connector for charging the battery 61 in the state in which the battery pack is mounted to the vehicle body 2 (assembled state of vehicle).

The vehicle body 2 includes vehicle body electric components which operate at a voltage which is lower than the activation voltage of the electric motor 12, while the battery pack includes pack electric components which are mounted to the casing and operate at a voltage which is lower than the activation voltage of the electric motor 12. The vehicle body 2 may include the vehicle body input connector 34 for supplying the electric power to the vehicle body electric components. In this configuration, in the state in which the battery pack is detached from the vehicle body 2, the bench check of driving can be conducted by connecting the (low-voltage) outside electric power supply to the vehicle body input connector and supplying the electric power to the vehicle body electric components. Therefore, in a case where bench check of driving is conducted even in the state in which the battery pack is detached from the vehicle body 2, the operation of the vehicle body electric components can be confirmed. Further, the battery pack may include a pack input connector (detail is not shown) for supplying the electric power to the pack electric components. In this configuration, even in the state in which the battery pack is detached from the vehicle body 2, the operation of the pack electric components can be confirmed, the charging/discharging test of the battery 61 can be conducted, and maintenance charging can be performed, by connecting the (low-voltage) outside electric power supply to the pack input connector in the same manner.

The battery pack may include the voltage decrease circuit 78 which is connected to the battery 61 and decreases the voltage of the battery 61, and an output connector 77 which is electrically connected to the vehicle body input connector and can supply the electric power with the voltage decreased by the voltage decrease circuit 78 to the vehicle body input connector in the state in which the casing is mounted to the vehicle body 2. In accordance with this configuration, even in the state in which the battery pack is detached from the vehicle body 2, the operation of the voltage decrease circuit 78 can be confirmed by connecting an outside detector to the output connector 77.

In the state in which the casing is mounted to the vehicle body 2, the output connector 77 may be close to the vehicle body input connector 34, and at least one of the output connector 77 and the vehicle body input connector 34 may be connected to its body side via a flexible cable. In accordance with this configuration, at least one of the output connector 77 and the vehicle body input connector 34 is connected to its body side (components of the battery pack for the output connector 77 and components of the vehicle body 2 for the vehicle body input connector 34) via the cable. This makes it possible to easily mount and detach these connectors without increasing the accuracy with which the battery pack is mounted to the vehicle body 2. Since the output connector 77 is close to the vehicle body input connector 34, the cable connected to at least one of the output connector 77 and the vehicle body input connector 34 can be reduced in length.

In the state in which the casing is mounted to the vehicle body 2, the driving power supply connector may be close to the vehicle body power supply connector 32 and at least one of the driving power supply connector and the vehicle body power supply connector 32 may be connected to its body side via a flexible cable. In accordance with this configuration, at least one of the driving power supply connector and the vehicle body power supply connector 32 is connected to its body side (components of the battery pack for the driving power supply connector and components of the vehicle body 2 for the vehicle body power supply connector 32) via the cable. This makes it possible to easily mount and detach these connectors without increasing the accuracy with which the battery pack is mounted to the vehicle body 2. Since the driving power supply connector is close to the vehicle body power supply connector 32, the cable connected to at least one of the driving power supply connector and the vehicle body power supply connector 32 can be reduced in length.

The vehicle body 2 may have a pack storage space (corresponding to the above storage space 2*a*) for storing the battery pack. A region which is a sum of the pack storage space and a space located above the pack storage space may be increased in dimension in the forward and rearward direction, as it extends in an upward direction. In accordance with this configuration, by moving the battery pack with respect to the vehicle body 2 in the vertical direction, the battery pack can be inserted into the pack storage space or pulled out of the pack storage space without interfering with the vehicle body 2.

Although in the above described embodiment, the steering system is a front fork type, a steering system of a different type may be applied to the vehicle body 2. For example, the vehicle body 2 may include the vehicle body frame 11, the front wheel 13, a front wheel support arm which extends forward from the vehicle body frame 11 and supports the front wheel 13 such that the arm is angularly displaceable around a front wheel pivot shaft, and a handle which is rotatable around a steering rotary shaft (corresponding to the above steering shaft 21), and the steering rotary shaft may be away in a forward direction from a caster axis as the steering rotary shaft extends in an upward direction from an intersection of the steering rotary shaft and the caster axis. In accordance with this configuration, the handle is placed in a location which is as forward as possible, and a portion of the space below the handle, which portion is hidden by the handle when viewed from above, can be reduced. This makes it possible to increase the size of the battery pack in the forward and rearward direction, and easily mount and detach the battery pack.

As described above, the vehicle body 2 includes the vehicle body power supply connector 32 for supplying the electric power to the electric motor 12, and the vehicle control unit 26 which controls the inverter 25 and hence the electric motor 12. Therefore, by connecting the electric power supply which is similar to the battery 61 to the vehicle body power supply connector 32, the electric motor 12 can be activated even in the state in which the battery unit 3 is detached from the vehicle body 2. Even in the state in which the battery unit 3 is not mounted to the vehicle body 2, the vehicle body 2 can drive standing on the ground such that only the front and rear wheels 13, 14 are grounded, by activating the electric motor 12. Therefore, in the present embodiment, the bench check of driving of the vehicle body 2 can be conducted in the state in which the battery unit 3 is detached from the vehicle body 2. Since the battery unit 3 includes the charging connector 65, the battery 61 can be charged using the charging connector 65 in the state in which the battery unit 3 is detached from the vehicle body 2. Therefore, for a period of time from when the vehicle body 2 and the battery unit 3 are independently manufactured until a time just before the battery unit 3 is mounted to the vehicle body 2 and the finished vehicle is handed over to a customer (user), the vehicle body 2 and the battery unit 3 are allowed to be stored and transported in the state in which the vehicle body 2 and the battery unit 3 are physically separated from each other. Therefore, the stock management of the electric motorcycle 1 (especially, battery unit 3) can be easily carried out. Hereinafter, the exemplary assembling method and assembling management method of the electric motorcycle 1 which focus on this point, will be described.

Figure 4:
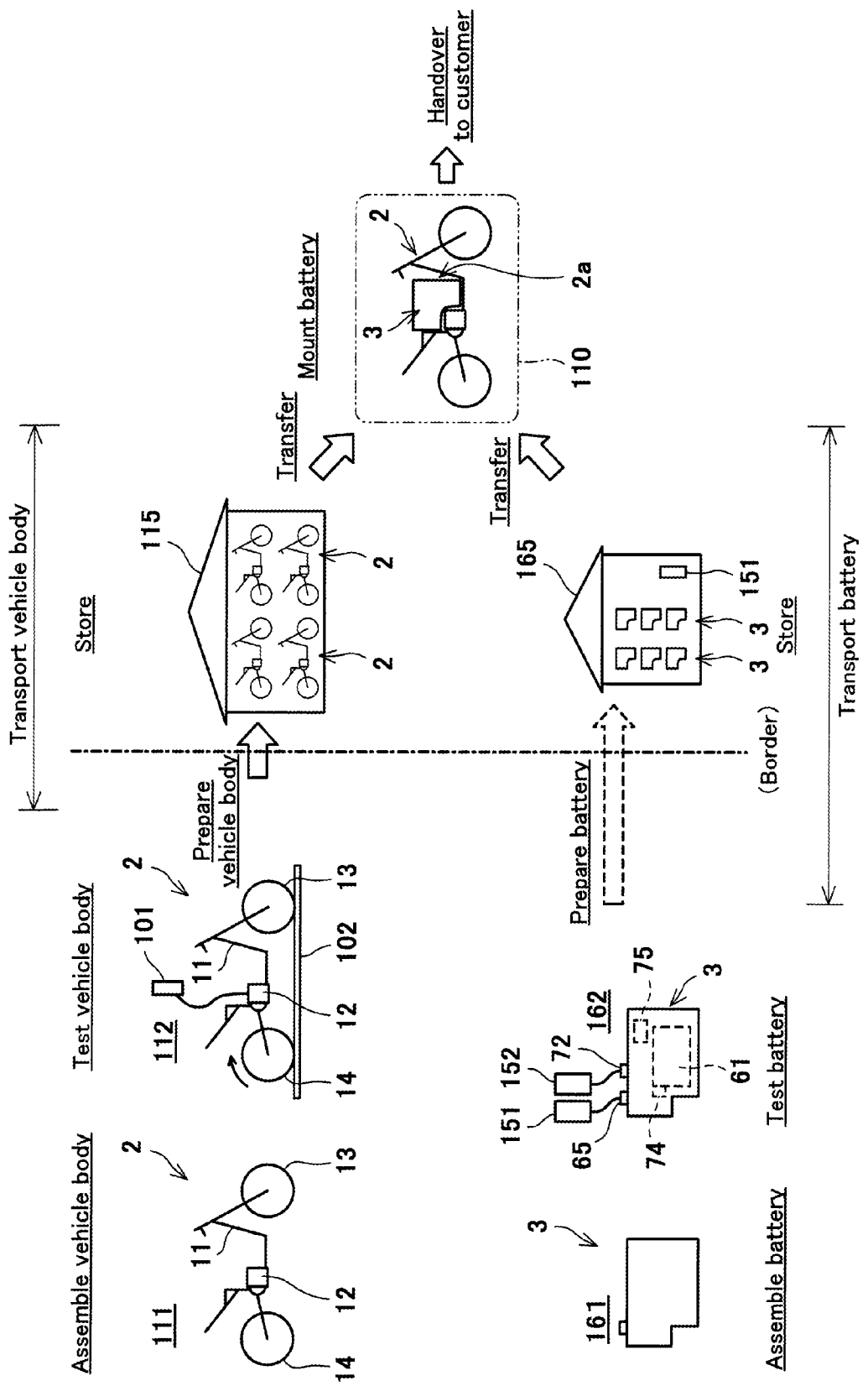
FIG. 4 is a flowchart showing an assembling method and assembling management method of the electric motorcycle of FIG. 1.

FIG. 4 is a flowchart showing the assembling method and assembling management method of the electric motorcycle 1 (especially new motorcycle) of FIG. 1. As shown in FIG. 4, to assemble the electric motorcycle 1 as the finished vehicle, firstly, the vehicle body 2 is assembled in a vehicle body assembling place 111 (vehicle body assembling step). The assembled vehicle body 2 is moved in the state in which the battery unit 3 is not mounted to the vehicle body 2, and a vehicle body test is carried out in a vehicle body test place 112 (vehicle body test step). In the vehicle body test, the power supply unit 101 installed on the vehicle body test place 112 is connected to the electric motor 12. Specifically, a test power supply connector (not shown) connected to the power supply unit 101 is mechanically and electrically connected to the vehicle body power supply connector 32 (see FIG. 3), and thereby the power supply unit 101 allows the electric motor 12 to be activated. Since the low-voltage battery 24 (see FIG. 3) is mounted to the vehicle body 2 before the vehicle body test, the vehicle control unit 26 (see FIG. 3) can be activated. Therefore, the inverter 25 (see FIG. 3) can perform the switching operation, and the lamp system can operate.

The vehicle body test refers to a whole test of the components relating to driving such as an operation system of the rider, a driving system, and a lamp system. The vehicle body test includes, for example, confirmation of the state of the driving power transmission from the electric motor 12 to the wheels 13, 14. Typically, the wheels 13, 14 are put on a test table 102 and the drive wheel 14 is rotated so that the vehicle body 2 is caused to drive in a pseudo-manner on the test table 102 without moving the vehicle body 2 with respect to the ground. In this way, the driving power transmission state is confirmed. After the vehicle body test is finished, the power supply unit 101 is detached from the vehicle body 2.

A vehicle body manufacturing number is provided to the vehicle body 2 which has passed the vehicle body test. The vehicle body 2 is prepared as a shipping product so that the vehicle body 2 will be combined with the battery unit 3. The vehicle body 2 is moved with hands or mechanically transported from the vehicle body test place 112 to a mounting place 110 (vehicle body preparation step, vehicle body transportation step). In the present embodiment, an operator can move the vehicle body 2 with hands while steering the steering handle, and can change the moving direction of the vehicle body 2. As should be understood, the assembling method and assembling management method of the present embodiment are effectively applied to a vehicle including the vehicle body 2 which can be moved with hands while gripping the steering handle.

In a flow which is different from the manufacturing and test of the vehicle body 2, the battery unit 3 is assembled in a battery assembling place 161 (battery assembling step). The assembled battery unit 3 is moved in the state in which the battery unit 3 is not mounted to the vehicle body 2, and its quality is tested in a battery test place 162 (battery test step). The battery test place 162 may be the same as the battery assembling place 161.

In the quality test, the electric configuration of the battery unit 3 is mainly tested. The quality test may include, for example, a test for checking whether or not the cell monitoring units 74 and the battery monitoring unit 75 operate correctly, a test for checking whether or not the relays operate correctly, a test for checking whether or not the battery 61 is charged correctly when the outside electric power supply 151 is connected to the charging connector 65, a test for checking whether or not the battery 61 is discharged correctly, when the electric motor or similar electric load 152 is connected to the battery power supply connector 72, etc.

A battery manufacturing number is provided to the battery unit 3 which has passed the quality test. The battery unit 3 is prepared as a shipping product so that the battery unit 3 will be combined with the vehicle body 2. The battery unit 3 is transported from the battery test place 162 to the mounting place 110 (battery preparation step, battery transportation step).

The vehicle body 2 having been prepared and transported meets the battery unit 3 having been prepared and transported separately from the vehicle body 2, in the mounting place 110. Prior to the hand-over of the electric motorcycle 1 to the customer (purchaser), the battery unit 3 is mounted to the vehicle body 2 in the mounting place 110 (battery mounting step).

The vehicle body assembling place 111 and the vehicle body test place 112 are typically, a manufacturing factory of the vehicle body 2. The battery assembling place 161 and the battery test place 162 are typically, a manufacturing factory of the battery unit 3. In other words, typically, vehicle body sites 111, 112 which are the vehicle body assembling place 111 and the vehicle body test place 112, respectively, are managed by a manufacturer of the vehicle body 2 or belong to it. Typically, battery sites 161, 162 which are the battery assembling place 161 and the battery test place 162, respectively, are managed by a manufacturer of the battery unit 3 or belong to it. The manufacturer of the vehicle body 2 and the manufacturer of the battery unit 3 may be the same or different from each other.

The mounting place 110 is different geographically from the assembling places 111, 161 and the test places 112, 162, and is, for example, a retailer of the electric motorcycle 1 as the finished vehicle. In other words, the mounting place 110 is managed by the retailer of the electric motorcycle 1 or belongs to it. Note that the retailer of the vehicle provides test and maintenance services. There are maintenance devices used to mount the battery unit 3 on the vehicle body 2 in the mounting place 110. The technique for the mounting operation can be easily learned in the mounting place 110. As described above, in the electric motorcycle 1 according to the present embodiment, the battery unit 3 can be mounted to the vehicle body 2 which has passed the test, without conducting an additional test. This can lessen an operation burden in the mounting place 110. In particular, in the present embodiment, the finished vehicle is the electric motorcycle 1 which is an exemplary straddle-type vehicle. The straddle-type vehicle has the vehicle body 2 with a relatively small weight. Therefore, the operator can move the vehicle body 2 with hands. This also makes it possible to lessen an operation burden in the mounting place 110. As a result, the above described assembling method can be realized.

The vehicle body 2 is manufactured by line production, while the battery unit 3 is manufactured by cell production. In the line production of the vehicle body 2, in the course of the transfer of the vehicle main body (vehicle body frame 11 and the like), the associated components and members are sequentially mounted thereto. To this end, the vehicle body assembling place 111 is required to have a relatively large size to perform the vehicle body assembling step. In the mounting operation, the associated components and members are sequentially mounted with a mechanically relatively large force using tools such as a torque wrench and a driver. By comparison, in the cell production of the battery unit 3, the associated components and members are sequentially mounted to a battery body (battery unit case 62 and the like) placed in a fixed position. For this reason, the battery assembling step can be carried out even in the battery assembling place 161 which is relatively narrow. However, in light of the characteristics of the battery 61, the battery assembling place 161 is required to be subjected temperature control and insulation control. In the assembling operation, the associated components and members are mounted with a mechanically relatively small force, by welding, or using tools such as a driver.

In the present embodiment, the battery unit 3 and the vehicle body 2 are independently assembled in the different assembling places 161, 111, respectively. Therefore, the battery unit 3 and the vehicle body 2 can be independently assembled in factories which are suitable for the assembling. The battery unit 3 and the vehicle body 2 which have been independently assembled in the different assembling places 161, 111, respectively, get together in the mounting place 110 which is different from the assembling places 161, 111. Since it is not necessary to move the battery unit 3 to the vehicle body assembling place 111, a management operation burden in the vehicle body assembling place 111 and the vehicle body test place 112 can be lessened. Since the battery unit 3 can be transported to a location which is close to the location where the vehicle is provided to the customer, in the state in which the battery unit 3 is not mounted to the vehicle body 2, the weight of the vehicle body 2 can be reduced during the transportation of the vehicle body 2. As a result, cost for the transportation of the vehicle body 2 can be reduced.

The vehicle body test is conducted in the state in which the battery unit 3 is not mounted to the vehicle body 2. As described above, the vehicle body test refers to the test for the components relating to driving, i.e., the test for the components directly associated with the driving, and therefore is required to be conducted adequately. If the test is conducted in the state in which the battery unit 3 is mounted to the vehicle body 2, it cannot be clearly detected whether the battery unit 3 has an abnormality or the vehicle body 2 has an abnormality, when the tests are not passed. Research for a cause of the abnormality becomes complicated. In the present embodiment, since the vehicle body test is conducted in the state in which the vehicle body 2 is separated from the battery unit 3, the problem associated with the failure of the test can be easily addressed.

When a comparison is made between the vehicle body 2 and the battery unit 3 mounted to the vehicle body 2, the battery unit 3 which starts to be assembled after the vehicle body 2 starts to be assembled is permitted to be mounted to the vehicle body 2. This can suppress degradation of the battery 61.

When providing plural kinds of vehicles, the manufacturer of the electric motorcycle 1 may prepare plural kinds of vehicle bodies 2 and a battery unit 3 common to these plural kinds of vehicle bodies 2. This makes it possible to reduce a period of time from when the battery unit 3 is assembled until the battery unit 3 is mounted to the vehicle body 2, and hence suppress degradation of the battery 61.

The battery assembling place 161 is distant from the vehicle body assembling place 111 and the vehicle body test place 112. The battery assembling place 161 may be closer to the mounting place 110 than the vehicle body assembling place 111 and the vehicle body test place 112 are. This makes it possible to reduce the distance over which the battery unit 3 is moved, and hence easily suppress degradation of the battery 61.

In a case where the vehicle body 2 is transported by a transportation unit such as a truck, ship or aircraft, the vehicle body 2 is preferably transported by a transportation unit which is different from that for transporting the battery unit 3, in the state in which the battery unit 3 is not mounted to the vehicle body 2. The transport unit for transporting the battery unit may be configured such that the temperature of the storage space thereof can be adjusted and/or its vibration can be suppressed. The period of time of the movement of the transport unit for transporting the battery unit is preferably short. Or, the vehicle body 2 and the battery unit 3 may be transported by the same transportation unit (large transportation unit such as ship). In that case, the vehicle body 2 and the battery unit 3 are placed in separate storage spaces, respectively, and the storage space for the battery unit 3 is preferably managed in severer environmental conditions of a temperature, a vibration, a humidity, and the like.

Although the mounting place 110 is the retailer as described above, the mounting place 110 is not limited to this. The electric motorcycle 1 may be for rental in a case where the electric motorcycle 1 is rented for a short period of time or leased for a long period of time. The mounting place 110 may be a rental retailer for the electric motorcycle 1. In this case, also, the battery unit 3 can be mounted to the vehicle body 2 at a time which is as late as possible, and the advantages as those provided by the retailer for the electric motorcycle 1 can be achieved. When the electric motorcycle 1 is sent back from the customer to a rental agent, the rental agent may detach the battery unit 3 from the electric motorcycle 1, mount the battery unit 3 which is in stock and sufficiently charged by the rental agent to the vehicle body 2 which is not provided with the battery unit 3 to assemble the electric motorcycle 1 as a finished vehicle, and rent the finished vehicle to another customer. In the present embodiment, the test in mounting can be easily conducted, and the rental business can be easily performed. Only the battery unit 3 may be rented or leased. In that case, also, similar advantages can be achieved.

The mounting place 110 may be set to a location which is other than the location where the vehicle is provided to the customer, like the retailer or the rental store. For example, the mounting place 110 may be a maintenance shop which repairs or inspects the electric motorcycle 1. In the case of the maintenance shop, if an abnormality of the battery unit 3 is detected, it may be considered that the battery unit 3 will be newly mounted to the vehicle body 2. In the preset embodiment, the test in mounting can be simplified, and test and repair operations can be simplified. Or, the mounting place 110 may be a charging place. By newly mounting the battery unit 3 charged in the charging place, to the vehicle body 2, the test for resuming driving can be performed easily without performing the charging operation. The mounting place 110 may be a wholesale store which sells the electric motorcycle 1 to the retailer, or may be a location where the vehicle body 2 and the battery unit 3 are in stock for wholesale.

The mounting place 110 is closer to the location where the electric motorcycle 1 is provided to the customer (destination from the perspective of the manufacturer) than the test places 112, 162 are, or is the same as the test places 112, 162. The mounting place 110 and the test places 112, 162 may be located within the same country, or may be located to be distant in different countries. In either case, there are a transportation period and a stock period from when the vehicle body 2 and the battery unit 3 are independently prepared until the battery unit 3 is mounted to the vehicle body 2. Hereinafter, the period of time from the preparation until the mounting will be referred to as a stand-by period. The stand-by period includes the transportation period and the stock period.

For at least a portion of the stand-by period, the vehicle body 2 and the battery unit 3 are stored at a stage where they are not delivered to the mounting place 110 (storage step), and the vehicle body 2 and the battery unit 3 are sometimes transferred to the mounting place 110 (transfer step) after the storage step. In the storage step, the vehicle body 2 and the battery unit 3 are stored as, for example, stock products. In the storage step, the vehicle body 2 is stored in a vehicle body storage area 115, while the battery unit 3 is stored in a battery storage room 165. In this way, the vehicle body 2 and the battery unit 3 are transported separately and stored separately, until they are transferred to the mounting place 110. The battery storage room 165 may be located within the place in which the vehicle body storage area 115 is located, but is physically isolated from the vehicle body storage area 115. Air-conditioning environment such as a temperature and a humidity is adjusted within a specified air conditioning range (e.g., temperature range) suitable for the storage of the battery 61, using air-conditioning equipment, or the like. This can lessen degradation of the battery 61 in the storage step. If an attempt is made to obtain such advantages in the state in which the battery unit 3 is mounted to the vehicle body 2, it becomes necessary to increase the capacity of the battery storage room 165 under the air-conditioning control is required to be increased to accommodate the vehicle body 2. In the present embodiment, since the vehicle body 2 is allowed to be stored under non-air-conditioning control, the stock management of the electric motorcycle 1 can be performed more easily as compared to a case where the vehicle body 2 is stored under the air conditioning control.

The battery 61 is naturally discharged even in a state in which it is not used as the electric power supply, and significantly degraded due to excess discharge. In view of this, in the storage step of the battery unit 3, the battery 61 may be re-charged or tested. For example, whenever a certain period passes, the outside electric power supply 151 installed within the battery storage room 165 may be connected to the charging connector 65 to charge the battery 61, for the purpose of maintenance of the battery 61. This charging may be carried out in a step which is just before the transfer step. Or, the extent of the degradation of the battery 61 may be tested in a step which is just before the transfer step. The battery 61 which cannot obtain a favorable test result does not proceed to the transfer step, but may be returned to the battery assembling place 161 to be maintained or replaced. Note that the battery unit 3 may also be stored in a space under the temperature control, in the transfer step. This can further suppress degradation of the battery 61, and is advantageous in the case where the mounting place 110 is physically distant from the battery storage room 165.

The battery unit 3 is not mounted to the vehicle body 2 until the battery unit 3 is delivered to the mounting place 110. Therefore, for the stand-by period that passes from when the battery unit 3 has passed the quality test until it is actually handed over to the customer, the quality control of the battery unit 3 can be performed easily. In the battery mounting step, the battery unit 3 which has been re-charged or could attain a favorable test result in the storage step can be mounted to the vehicle body 2. This can lessen a maintenance operation burden of the battery 61 in the mounting place 110 and provide the customer with the electric motorcycle 1 of a high quality, which is the advantage.

The vehicle body storage area 115 may be located adjacently to the vehicle body test place 112. In a case where the vehicle body 2 is handed over from the manufacturer to the retailer or the like via the wholesale agent, the vehicle body storage area 115 may be provided in a location which is managed by the wholesale agent or belongs to the wholesale agent. Or, vehicle body storage area 115 may be provided in a location which is managed by a logistics agent or belongs to the logistics agent. Although only one vehicle body storage area 115 is shown in FIG. 4, a plurality of vehicle body storage areas 115 may be provided between the vehicle body test place 112 and the mounting place 110. The same applies to the battery storage room 165. In a case where a product which was in a market and now is distributed as a used car, away from the customer, it becomes necessary to mount only a new battery unit in the used vehicle, or detach an old battery unit and mount a used battery unit with less degradation. This operation can be carried out in the mounting place 110.

In the case where the mounting place 110 and the test places 112, 162 are located in different countries, the vehicle body storage area 115 may be located within the same country as the country where the test places 112, 162 are located or within the same country as the country where the mounting place 110 is located. The same applies to the battery storage room 165. Especially, the battery storage room 165 is preferably located within the same country as the country where the mounting place 110 is located. This makes it possible to carry out the maintenance for the battery unit 3 in a step which is just before the battery unit 3 is delivered to the mounting place 110 in the course of transporting the battery unit 3 from the test place 162 to the mounting place 110. In this way, the battery unit 3 can be transferred to the mounting place 110 while suppressing degradation of the battery 61. In this case, the battery storage room 165 may be provided in a location which is managed by an import agent and/or a wholesale agent in the country in which the mounting place 110 is located, or belongs to the import agent and/or wholesale agent.

In importing and exporting of the battery unit 3, in the battery transportation step, the battery unit 3 is transported overseas for a long time, and passes through a low-latitude region, in many cases. For this reason, the temperature control of the battery unit 3 may be required to suppress degradation, in sea transportation. In the present embodiment, since the battery unit 3 is transported in the state in which the battery unit 3 is not mounted to the vehicle body 2 and is mounted to the vehicle body 2, in a location to which the battery unit 3 is transported, only the battery unit 3 can be transported under the temperature control. By comparison, special temperature control is not necessary for the vehicle body 2 during the transportation. Therefore, the degradation of the battery 61 can be suppressed while lessening a transportation cost, as compared to a case where the battery unit 3 is transported in the state in which the battery unit 3 is mounted to the vehicle body 2.

The battery unit 3 and the vehicle body 2 get together in the mounting place 110, where the battery unit 3 is mounted to the vehicle body 2. In the battery mounting step, it is determined whether or not the battery unit 3 is permitted to be mounted to the vehicle body 2. Only when it is determined that the battery unit 3 is permitted to be mounted to the vehicle body 2, the battery unit 3 and the vehicle body 2 which are determined as being permitted to be assembled, can be assembled into the electric motorcycle 1, and the electric motorcycle 1 can be provided to the customer as the finished vehicle. This can prevent a situation in which the finished vehicle including an unfavorable battery unit 3 is provided to the customer. An operator may determine whether or not the battery unit 3 is permitted to be mounted to the vehicle body 2. Or, an assembling management system 200, as will be described later, (see FIG. 5) may automatically determine whether or not the battery unit 3 is permitted to be mounted to the vehicle body 2.

Figure 5:
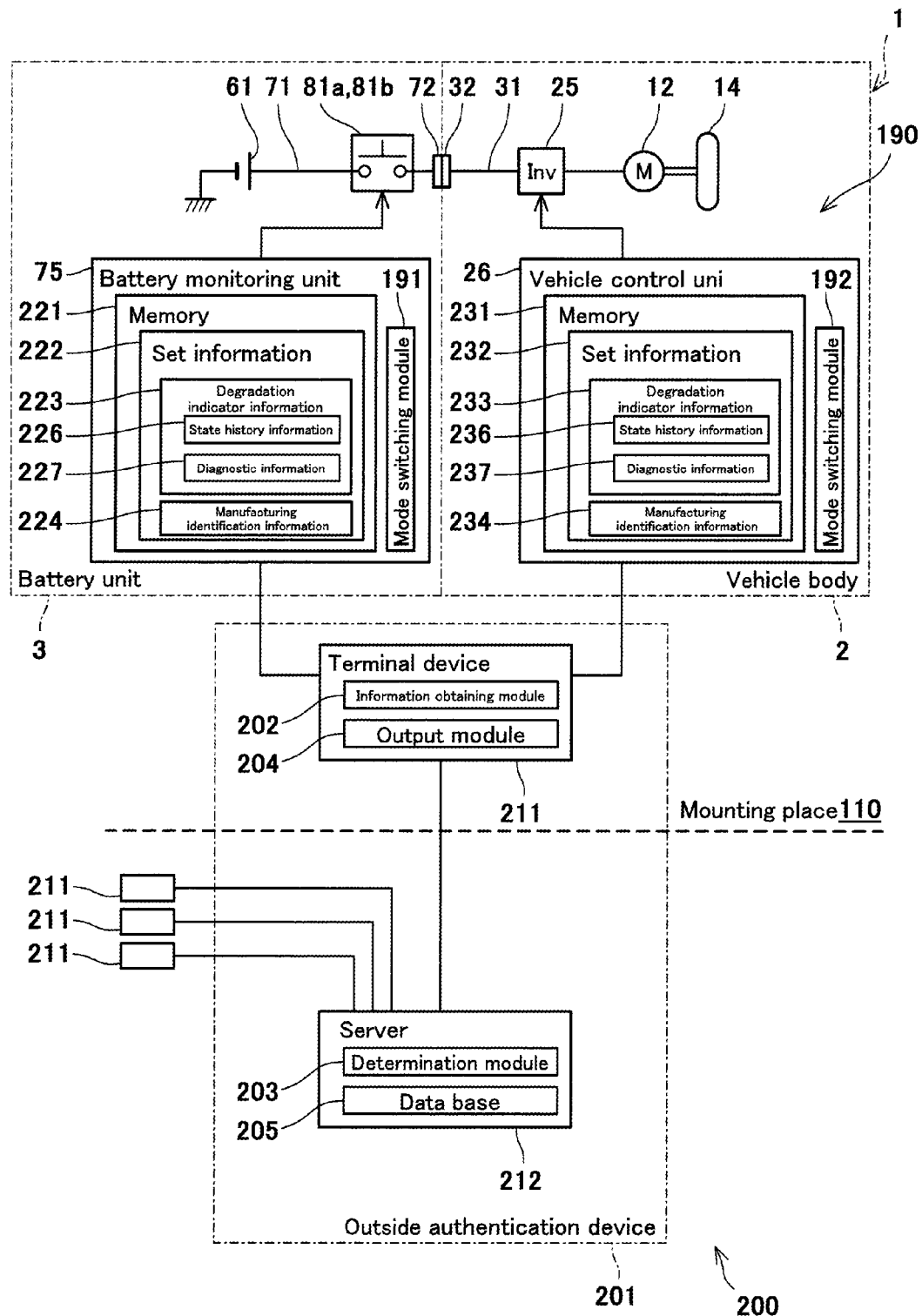
FIG. 5 is a block diagram showing the configuration of an assembling management system which determines whether or not a battery unit is permitted to be mounted to a vehicle body in a battery mounting step of FIG. 4.

FIG. 5 is a block diagram showing the configuration of the assembling management system 200 which determines whether or not the battery unit 3 is permitted to be mounted to the vehicle body 2 in the battery mounting step of FIG. 4. As shown in FIG. 5, the assembling management system 200 includes an outside authentication device 201 which is communicatively connected to the electric motorcycle 1. By using the outside authentication device 201, it is not necessary to incorporate an authentication device into the electric motorcycle 1, which can prevent an increase in the size of the electric motorcycle 1. In the present embodiment, the electric motorcycle 1 includes a switching system 190 which is able to perform switching between a permission state in which the electric motor 12 is permitted to operate, and an inhibiting state in which the electric motor 12 is inhibited from operating. In the present embodiment, the switching system 190 is configured to perform switching between connection and disconnection of the battery 61 and the electric motor 12.

The switching system 190 includes, as one example of a hardware component, an opening/closing unit which is provided on a wire which electrically connects the battery 61 to the electric motor 12, in the state in which the battery unit 3 is mechanically connected to the vehicle body 2, and opens and closes the wire. The opening/closing unit is always open and closes the wire in response to a command from an opening/closing control unit. The hardware component of the switching system 190 may include the opening/closing control unit. The above stated relays 81*a*, 81*b* are one example of the opening/closing unit, while the above stated battery monitoring unit 75 is one example of the opening/closing control unit. The opening/closing unit and the opening/closing control unit may be mounted in the vehicle body 2. The AC electric motor 12 is unable to operate with the AC power generated by converting the DC power supplied from the DC battery 61 as the electric power supply, unless the inverter 25 performs a proper switching operation. Therefore, the hardware component of the switching system 190 may include the inverter 25, and further include an inverter control unit (e.g., vehicle control unit 26) for controlling the operation of the inverter 25.

The switching system 190 includes, as one example of a software component, a first mode switching module 191 which performs switching between an initial mode which does not include the step of controlling the opening/closing unit and a driving permission mode which provides a closing command to the opening/closing unit to allow the electric motorcycle 1 to move with the driving power generated by the electric motor 12 using the electric power supplied from the battery 61. In addition, the switching system 190 includes, as one example of the software component, a second mode switching module 192 which performs switching between an initial mode which does not include the step of controlling the inverter 25 and a driving permission mode which provides a control command of the switching operation to the inverter 25 to allow the electric motorcycle 1 to move as in the above case.

In the initial state, the initial mode is set in the mode switching modules 191, 192. In the state in which the initial mode is set in one of the mode switching modules 191, 192, the electric motor 12 cannot operate even in the state in which the battery unit 3 is mounted to the vehicle body 2. In other words, the switching system 190 is placed in the above stated inhibiting state. When the battery unit 3 is properly mounted to the vehicle body 2 and the driving permission mode is set in the mode switching modules 191, 192, the switching system 190 is placed in the above stated permission state.

The second mode switching module 192 is implemented by the inverter control unit (e.g., vehicle control unit 26). In the present embodiment, the opening/closing unit (e.g., relays 81a, 81b), and the opening/closing control unit (e.g., battery monitoring unit 75) are provided in the battery unit 3, and the first mode switching module 191 is implemented by the opening/closing control unit. Although the two modules 191, 192 are provided separately as described above, the modules 191, 192 may be implemented by an integrated control unit, if the opening/closing control unit can be integrated with the inverter control unit.

The outside authentication device 201 includes an information obtaining module 202 which obtains set information 222, 232 set in the vehicle body 2 or the battery unit 3 to allow the battery unit 3 to be mounted to the vehicle body 2, a determination module 203 which determines whether or not the battery unit 3 is permitted to be mounted to the vehicle body 2 (hence determines whether or not the electric motor 12 is permitted to operate), based on the set information 222, 232, and an output module 204 which outputs an electric signal indicating whether a permission state or an inhibiting state should be set in the switching system 190 according to a result of the determination of the determination module 203.

The outside authentication device 201 is communicatively connected to the electric motorcycle 1 such that the output module 204 can transmit the above stated electric signal to the switching system 190 of the electric motorcycle 1 to allow the information obtaining module 202 to access memories 221, 231 of the electric motorcycle 1, which contain the set information 222, 232, respectively. The information obtaining module 202 transmits the set information 222, 232 to the determination module 203. The determination module 203 performs determination based on the received set information 222, 232. In this determination, the determination module 203 verifies at least a portion of the set information 222, 232 with the information stored in a data base (centralized storage module) 205. Or, at least a portion of the set information 222, 232 obtained by the information obtaining module 202 may be stored and updated in the data base 205.

The output module 204 outputs the electric signal to the opening/closing control unit (e.g., battery monitoring unit 75) and the inverter control unit (e.g., vehicle control unit 26) of the switching system 190. When receiving the electric signal indicating that the permission state should be set in the switching system 190, the switching system 190 shifts the inhibiting state to the permission state. In the present embodiment, the two mode switching modules 191, 192 shift the initial mode to the driving permission mode, thereby allowing the switching operation to occur such that the opening/closing unit can be closed and the inverter 25 can supply the AC power to the electric motor 12. On the other hand, when receiving the electric signal indicating that the inhibiting state should be set in the switching system 190, the switching system 190 maintains the inhibiting state. In the present embodiment, the two mode switching modules 191, 192 maintain the initial mode, thereby maintaining a state in which the opening/closing unit is not closed and the inverter 25 does not perform the switching operation.

The information obtaining module 202, the determination module 203, the output module 204, and the data base 205 may be placed in separate devices or may be integrated into a common device. In the present embodiment, the information obtaining module 202 and the output module 204 are integrated into the same terminal device 211. The terminal device 211 directly communicates the information with the control unit provided in the electric motorcycle 1. The determination module 203 and the data base 205 are implemented by a server (administrative device) 212 which is different from the terminal device 211. The terminal device 211 is communicatively connected to the server 212 using a known communication infrastructure technique. The terminal device 211 is used in the mounting place 110 so that the terminal device 211 can easily communicate the information with the electric motorcycle 1. The server 212 is provided in a place different from the mounting place 110.

In the present embodiment, many mounting places 110 are geographically dispersed. In the system 200, the plurality of terminal devices 211 are provided to correspond to the number of the mounting places 110, while the single server 212 may be provided. In the case where the data base 205 is provided in the single server 212 in this way, the data base (centralized storage module) 205 can store the set information 222, 232 of the electric motorcycle 1 which are gathered every time the battery mounting step is performed in each mounting place 110, from the many mounting places 110 geographically dispersed.

The set information 222, 232 include the battery set information 222 relating to the battery 61 and the vehicle body set information 232 relating to the vehicle body 2, respectively. The battery set information 222 is stored in the memory 221 mounted in the battery unit 3. The above stated battery monitoring unit 75 cooperates with the cell monitoring units 74 to gather or generate the battery set information 222. The memory 221 may be implemented by the storage area of the battery monitoring unit 75. The vehicle body set information 232 is stored in the memory 231 mounted in the vehicle body 2. The above stated vehicle control unit 26 is communicatively connected to sensors which detect vehicle states, and is able to gather or generate the vehicle body set information 232. The memory 231 may be implemented by the storage area of the vehicle control unit 26.

The battery set information 222 includes degradation indicator information 223 relating to the degradation of the battery 61 and manufacturing identification information 224 relating to a battery manufacturing number. When the battery 61 has passed the quality test and the battery manufacturing number is provided to the battery 61, the manufacturing identification information 224 is stored in the memory 221 in, for example, the battery test place 162 (see FIG. 4).

The degradation indicator information 223 includes state history information 226 indicating the history of the state of the battery 61. The state history information 226 is time-series data indicating the state of the battery 61 or data generated based on the time-series data. The state history information 226 is obtained regularly irrespective of whether or not the battery unit 3 is mounted to the vehicle body 2. More specifically, even for a period (the above stated stand-by period), from when the battery unit 3 is prepared to be mounted to the vehicle body 2 until the battery unit 3 is actually mounted to the vehicle body 2, the battery monitoring unit 75 obtains the state history information 226 regularly and stores the state history information 226 in the memory 221. The assembling method and assembling management method of FIG. 4 include a battery detection step for detecting the state of the battery 61 before the battery mounting step (more specifically, after the battery test step).

In the present embodiment, the battery monitoring unit 75 is configured to operate with the electric power supplied from the battery 61. To this end, the battery monitoring unit 75 may close the relays 83*a*, 83*b*, 85*a*, 85*b* in the above stated initial mode. The battery monitoring unit 75 includes a timer, and stores the state history information 226 in the memory 221 every time the timer measures a particular time. In this configuration, even in the state in which the battery unit 3 is not mounted to the vehicle body 2, the state history information 226 can be obtained regularly.

The state history information 226 includes, for example, discharge amount information indicating the total discharge amount of the battery 61, use time information indicating the total time for which the battery 61 is used as the electric power supply for the electric motor 12 in the state in which the battery unit 3 is mounted to the vehicle body 2, battery ambient temperature information relating to the ambient temperature of the battery 61, battery vibration information indicating a vibration applied to the battery 61, battery temperature information indicating the temperature of the battery 61 itself, etc. The discharge amount information and the use time information are updated at every timing at which the state history information 226 is obtained. This makes it possible to prevent an increase in a data volume which would increase a burden on the memory 221, even when the battery 61 is used for a long period of time. Manufacturing date information of the battery 61 may be used as the use time information. Each of the cell monitoring units 74 sequentially detects the temperature of the corresponding battery cell 61*a*, and sequentially outputs a detection signal to the battery monitoring unit 75. The battery monitoring unit 75 temporarily stores the time-series data received from the cell monitoring unit 74, and generates the temperature information using the stored data, within a period from the timing at which the state history information 226 is obtained previously, until the timing at which the state history information 226 is obtained presently. The temperature information may be information indicating a highest temperature, a lowest temperature, and an average temperature. The information indicating the highest temperature, the lowest temperature, and the average temperature is generated using the time-series data received from the cell monitoring unit 74 for a period from when generation and storage of the state history information 226 have started until the timing at which the state history information 226 is obtained presently. This makes it possible to prevent an increase in a data volume which would increase a burden on the memory 221, even when the battery 61 is used for a long period of time, as in the case of the discharge amount information.

The degradation indicator information 223 may include diagnostic information 227 indicating whether or not the battery 61 is in a normal condition. For example, the diagnostic information 227 may include ground leakage information indicating that ground leakage of the battery 61 has occurred. To this end, the battery unit 3 may include a ground leakage sensor (not shown) for detecting a ground leakage, and the battery monitoring unit 75 may be communicatively connected to the ground leakage sensor. The ground leakage information may be stored in the memory 221 at the same timing as the timing at which the state history information 226 is obtained, or upon reception of the signal from the ground leakage sensor. Or, the diagnostic information may include electric component abnormality information indicating that an abnormality (e.g., relay remains incapable of moving from an open or closed state) has occurred in the electric component of the battery unit 3. To this end, the battery monitoring unit 75 may store a relay opening/closing sequence program dedicated to detection of the state in which the relay remains incapable of moving from the open or closed state, and this program may be run at the same timing as the timing at which the state history information 226 is obtained.

The vehicle body set information 232 includes degradation indicator information 233 relating to the degradation of the vehicle body 2 and manufacturing identification information 234 relating to the manufacturing number of the vehicle body 2. When the vehicle body 2 has passed the vehicle body test and the vehicle body manufacturing number is provided to the vehicle body 2, the manufacturing identification information 234 is stored in the memory 231 in, for example, the vehicle body test place 112 (see FIG. 4).

The degradation indicator information 233 includes state history information 236 indicating the history of the state of the vehicle body 2. The state history information 236 includes distance information indicating the total driving distance of the vehicle body 2, use time information indicating the use time of the vehicle body 2, rotational speed information indicating the rotational speed of the electric motor 12 during use, motor temperature information relating to the temperature of the electric motor 12, inverter temperature information relating to the temperature of the inverter, total current amount information indicating the amount of a current flowing through the inverter 25, etc. The rotational speed information may be, for example, information (rotational speed histogram) relatively indicating use frequency in each of a plurality of rotational speed zones defined within a rotational speed range from zero to a rated rotational speed. The motor temperature information and the inverter temperature information are generated as in the battery temperature information, and do not become a large burden on the memory 231.

The degradation indicator information 233 may include diagnostic information 237. For example, the diagnostic information 237 may include ground leakage information indicating that a ground leakage has occurred in the electric component mounted to the vehicle body 2, falling information indicating that the vehicle body 2 has fallen, and collision information indicating that the vehicle body 2 has collided with something. To this end, the vehicle control unit 26 is communicatively connected to a sensor (not shown) for detecting a ground leakage, or a sensor for detecting that the vehicle body 2 has fallen.

When an ignition switch (not shown) mounted to the vehicle body 2 is turned ON, the vehicle control unit 26 is allowed to operate with the electric power supplied from the low-voltage battery 24. For this reason, the degradation indicator information 233 is obtained in the case where the vehicle body 2 combined with the battery unit 3 is assembled into the electric motorcycle 1 as the finished vehicle, and the ignition switch is ON, and is not stored in the vehicle body 2 as a new product or a non-sold product.

In the system 200 of the present embodiment, when the battery unit 3 is mounted to the vehicle body 2, an operator connects the terminal device 211 to the server 212, the vehicle control unit 26 and the battery monitoring unit 75. The ignition switch of the vehicle body 2 is turned ON and the vehicle control unit 26 is placed in a state in which it is able to operate. Then, authentication application stored in the terminal device 211 is activated to provide a start command of an authentication process.

In response to the start command, the assembling management method or the authentication process is performed, as described below. Specifically, the information obtaining module 202 of the terminal device 211 obtains the battery set information 222 from the memory 221, and the vehicle body set information 232 from the memory 231. The information obtaining module 202 transmits the obtained set information 222, 232 to the determination module 203 of the server 212.

The determination module 203 determines whether or not an authentication permission condition is satisfied, based on the set information 222, 232 transmitted to the determination module 203. The authentication permission condition includes an identification authentication condition relating to the manufacturing identification information 224, 234. The server 212 verifies the manufacturing identification information 224, 234 transmitted from the terminal device 211 with the identification information which is provided by the manufacturer of the battery unit 3 and the manufacturer of the vehicle body 2 and pre-stored in the data base 205. When the identification information of the data base 205 contains information corresponding to the manufacturing identification information 224, 234, regarding both of the vehicle body 2 and the battery unit 3, the identification authentication condition is satisfied.

The authentication permission condition includes a degradation authentication condition relating to the degradation indicator information 223, 233. The determination module 203 determines whether or not the battery unit 3 and the vehicle body 2 are suitable for practical use, i.e., requires maintenance/test, based on the degradation indicator information 223, 233. The determination module 203 determines whether or not the degradation authentication condition is satisfied based on a result of a comparison between the information of the degradation indicator information 223, 233 and predetermined thresholds. For example, if the total discharge amount of the battery 61 indicated by the discharge amount information exceeds a predetermined threshold, the battery 61 is not suitable for practical use and requires maintenance/test (including replacement), and it may be determined that the degradation authentication condition is not satisfied. Or, if the number of times the battery 61 is changed (replaced) or the number of times the battery 61 is charged exceeds a predetermined threshold, it may be determined that the degradation authentication condition is not satisfied. Or, if a specified time has passed since the battery unit 3 was manufactured, it may be determined that the degradation authentication condition is not satisfied. If the SOC (state of charge) of the battery 61 is lower than a predetermined threshold, it may be determined that the degradation authentication condition is not satisfied. Or, if the battery unit 3 is left in an unfavorable environment (e.g., temperature is high) for a period which is longer than a specified period, it may be estimated that degradation of the battery unit 3 has progressed, and it may be determined that the degradation authentication condition is not satisfied.

When both of the identification authentication condition and the degradation authentication condition are satisfied, the authentication permission condition is satisfied. When the authentication permission condition is satisfied, the determination module 203 of the server 212 transmits information indicating this, to the output module 204 of the terminal device 211. Receiving this information, the output module 204 outputs to the battery monitoring unit 75 and the vehicle control unit 26, the electric signals indicating that the permission state should be set in the battery monitoring unit 75 and the vehicle control unit 26 in the switching system 190. In response to this, the switching system 190 sets the permission state, in which state the electric motor 12 is permitted to operate and the electric motorcycle 1 is allowed to move with the driving power generated by the electric motor 12. The electric signal output from the output module 204 has a security code. Therefore, the state of the switching system 190 cannot be changed freely unless the authentication permission condition is satisfied using the system 200.

When the authentication permission condition is not satisfied, the determination module 203 of the server 212 transmits information indicating this, to the output module 204 of the terminal device 211. Receiving this information, the output module 204 outputs to the battery monitoring unit 75 and the vehicle control unit 26, the electric signals indicating that the inhibiting state should be set in the battery monitoring unit 75 and the vehicle control unit 26 in the switching system 190. In response to this, the switching system 190 maintains the inhibiting state, in which state the electric motor 12 cannot operate and the electric motorcycle 1 cannot move with the driving power generated by the electric motor 12, even in the state in which the battery unit 3 is properly mounted to the vehicle body 2. This makes it possible to prevent a situation in which the finished vehicle including the battery unit 3 and the vehicle body 2 which are not authenticated is provided to the customer. Especially, it becomes possible to prevent a situation in which the battery unit 3 which does not satisfy the degradation authentication condition and has a possibility of degraded performance is mounted to the vehicle body 2.

On the other hand, when the authentication permission condition is satisfied, the manufacturing identification information 234 of the vehicle body 2 which is authenticated is stored in the data base 205 such that the manufacturing identification information 234 is associated with the identification information of the battery stored in the data base 205. In the same manner, the manufacturing identification information 224 of the battery unit 3 is stored in the data base 205 such that the manufacturing identification information 224 is associated with the identification information of the vehicle body. In this way, the manufacturer of the electric motorcycle 1 can identify and track a combination of the vehicle body and the battery unit of the electric motorcycle 1 as the finished vehicle which is provided to the customer.

When the identification authentication condition is not satisfied, information indicating in which of the mounting places 110, the vehicle body 2 or the battery unit 3 containing incorrect manufacturing identification information exist, may be stored in the data base 205. This allows the manufacturer to track the distribution of unexpected product.

When the identification authentication condition is satisfied, the degradation indicator information 223, 233 may be stored in the data base 205 such that the degradation indicator information 223, 233 are associated with the corresponding identification information. Or, when the identification authentication condition is satisfied, the information indicating whether or not the authentication permission condition is satisfied may be stored in the data base 205 such that this information is associated with the corresponding identification information. That is, the input/output data of the information obtaining module 202 and the output module 204 may be stored in the data base 205. In this way, the manufacturer of the electric motorcycle 1 can track the states of its products shipped from the assembling places 111, 161 and the test places 112, 162.

By using the system 200 in the battery mounting step, it becomes possible to prevent a situation in which the finished vehicle including a combination of the vehicle body 2 and the battery unit 3 which are unfavorable ones is provided to the customer. In addition, the manufacturer can assure the quality of the electric motorcycle 1 as the finished vehicle, even in the case where the electric motorcycle 1 is assembled in a place which is not managed by the manufacturer, and can track the state of its product shipped, which is the advantage. Also, the manufacturer can confirm a failure in a combination of the vehicle body 2 and the battery unit 3, and a compatibility between the vehicle body 2 and the battery unit 3, by analyzing history information stored in the data base 205. As should be understood, the server 212 manages a matching history and log information.

In the present embodiment, the vehicle body 2 and the battery unit 3 are independently transported to the retailers, and the battery unit 3 is distributed completely independently of the electric motorcycle 1 as the finished vehicle or the vehicle body 2 and handled as a commercial product. This may cause a possibility that the battery unit 3 which is not manufactured by a genuine manufacturer is distributed. However, in accordance with the above described system 200, it is determined whether or not the battery unit 3 is permitted to be mounted to the vehicle body 2 according to a predetermined rule based on the manufacturing identification information. Therefore, the battery unit 3 which is not manufactured by a genuine manufacturer does not satisfy the identification authentication condition. Therefore, even if an attempt is made to assemble the finished vehicle using such an unfavorable battery unit, the electric motor 12 of the electric motorcycle cannot operate. As a result, it becomes possible to provide to the customer, the product whose quality is assured by the manufacturer.

In accordance with the above described system 200, it is determined whether or not the battery unit 3 is permitted to be mounted to the vehicle body 2, based on the result of detection relating to the state of the battery 61 in the battery transportation step (above described battery detection step). Therefore, even if a degradation occurs in the battery 61 in the battery transportation step, the corresponding battery unit 3 does not satisfy the degradation authentication condition. Therefore, even if an unfavorable battery unit 3 is incorporated into the vehicle body 2 to make a finished vehicle, the electric motor 12 of the motorcycle cannot operate. As a result, the manufacturer can provide the customer with the product of a high quality.

The system 200 is advantageous especially to the sale of used vehicles and the rent of vehicles as well as the sale of new vehicles. In this case, it is supposed that the battery unit 3 which was actually mounted in the electric motorcycle 1 is detached from the vehicle body 2 and newly mounted to the vehicle body 2 to provide the finished vehicle to another customer. There may be a possibility that a degradation has occurred in the vehicle body 2 and the battery unit 3, depending on the use history, storage state from previous use to present mounting, etc. In the present embodiment, it is determined whether or not the degradation authentication condition is satisfied, and thereby it becomes necessary to prevent a situation in which the vehicle body 2 or the battery unit 3 which is not suitable for practical use is used as the finished vehicle. To enable the system 200 to work effectively when the battery unit 3 is mounted to the vehicle body 2, in the sale of the used vehicle or the rent of the vehicle, the battery monitoring unit 75 and the vehicle control unit 26 may automatically shift to the initial mode, when the communication connectors 35, 80 are disconnected from each other. Thereby, the vehicle body 2 and the battery unit 3 in the state in which the communication connectors 35, 80 are disconnected, are not used as the finished vehicle, unless they go through the authentication in the system 200.

In the present embodiment, since the outside authentication device 201 (server 212) determines whether or not the battery unit 3 is permitted to be mounted to the vehicle body 2, according to the predetermined rule, improper mounting or a mounting operation which is not intended by the manufacturer, in the mounting place 110, can be prevented. To automatically perform the authentication process, the data base 205 of the outside authentication device 201 (server 212) contains required information. The information to be stored in the battery unit 3 and the information to be stored in the vehicle body 2 are only the set information 222, 232. This can reduce the capacities of the memories 221, 231. Since the outside authentication device 201 (server 212) determines whether or not the battery unit 3 is permitted to be mounted to the vehicle body 2, the degraded performance of the battery unit 3 is easily found. For example, when the battery unit 3 with the degraded performance is found, the manufacturing identification information of the battery unit 3 is stored in the data base 205 such that the manufacturing identification information is associated with the information indicating that the degraded performance is found and a transportation route. In this case, when the battery unit 3 which is stored and transported as in the battery unit 3 with the degraded performance, is going to be combined with the vehicle body 2, the determination module 203 may determine that the authentication permission condition is not satisfied, based on past information (in this case, information indicating that the degraded performance is found) stored in the data base 205. The information indicating the transportation route may be stored in the memory 231 together with the manufacturing identification information in the vehicle body test place 112.

Thus far, the embodiment has been described. The above described configuration may be changed, deleted, or combined with other configurations, within a scope of the spirit of the present invention.

The authentication permission condition may include a vehicle kind permission condition used to determine whether or not the vehicle body 2 and the battery unit 3 are compatible with each other. If the vehicle kind permission condition is not satisfied, then it may be determined that the authentication permission condition is not satisfied. In some cases, the manufacturer of the electric motorcycle 1 prepares plural kinds of vehicle bodies and plural kinds of battery units, and provides various kinds of electric motorcycles, by combining the vehicle bodies and the battery units in various ways. In this case, even when the vehicle body 2 and the battery unit 3 are genuine products, respectively, the manufacturer may not assume a combination of these. Therefore, when the combination of the vehicle body 2 and the battery unit 3 is the one which is not assumed by the manufacturer, it may be determined that the vehicle kind authentication condition is not satisfied. This can assure that the vehicle kind assumed by the manufacturer can be provided.

The authentication permission condition may include a condition relating to the information relating to the mounting place 110. For example, the determination module 203 may determine whether or not the vehicle body 2 and the battery unit 3 are the products which satisfy the regulations (e.g., maximum speed regulation) in the mounting place 110, based on the information of the mounting place 110 and the manufacturing identification information which are transmitted to the determination module 203. Or, the determination module 203 may determine whether the vehicle body 2 and the battery unit 3 are going to be combined in the place assumed by the manufacturer, based on the information of the mounting place 110 and the manufacturing identification information which are transmitted to the determination module 203, and destination information which is pre-stored in the data base 210 so as to be associated with the identification information. This makes it possible to provide the vehicle which is made in the correct mounting place 110. The information of the mounting place 110 is stored in the terminal device 211, and the information obtaining module 202 may transmit the information of the mounting place 110 to the determination module 203 together with the set information 222, 232.

The vehicle body 2 or the battery unit 3 may be mechanically and electrically configured so that if the vehicle body 2 or the battery unit 3 is altered beyond the scope of the manufacturer's assumption, then the information indicating this is stored in the memory 221, 231. In this case, the set information 222, 232 may include the information indicating that the vehicle body 2 or the battery unit 3 has been altered undesirably, and the determination module 203 may determine whether or not the vehicle body 2 or the battery unit 3 has been altered undesirably, based on the set information 222, 232 transmitted to the determination module 203. If the determination module 203 determines that the vehicle body 2 or the battery unit 3 has been altered undesirably, it may determine that the authentication permission condition is not satisfied.

The authentication permission condition may include a condition associated with the information relating to the customer. For example, in a case where the electric motorcycle which is permitted to be driven by the customer is small in size or displacement, the determination module may determine that the authentication permission condition corresponding to the vehicle body 2 incorporating the electric motor 12 with a high power output is not satisfied. Or, the information relating to the customer may be stored in the data base 205. The information relating to the customer may be input by the operator using the terminal device 211. Or, the data base 205 may store the information of the mounting place 110 where the finished vehicle will be made, or the information of the terminal device 211 (operator).

Although in the above embodiment, the switching system 190 includes the two mode switching modules 191, 192, it may include one of the mode switching modules 191, 192. The outside authentication device 201 may be implemented by, for example, a computer or a portable information terminal. The outside authentication device 201 may be a single device including the information obtaining module 202, the output module 204 and the determination module 203, and may not include the server 212. Or, it is sufficient that the information obtaining module 202 or the output module 204 are configured to perform input/output operations of the information, and may be mechanically connected to the electric motorcycle 1 via wires for communication, or wirelessly communicatively connected to the electric motorcycle 1.

The kind of the electric motor 12 and the kind of the battery 61 are not limited to the above examples. The electric motor 12 may be a DC motor instead of the AC motor. The battery 61 may be, for example, nickel metal hydride instead of the lithium ion battery.

The electric vehicle is not limited to the motorcycle. The present invention is applicable to any vehicle so long as the electric motor 12 is activated with the electric power supplied from the battery mounted to the vehicle body, and the electric motor 12 drives the wheels. Especially, the assembling method and assembling management method of the present invention are suitably applied to the electric vehicle incorporating the battery which is more likely to be degraded under the influence of a storage environment. The assembling method and assembling management method of the present embodiment are suitably applied to the electric vehicle in which the battery unit 3 is mounted to the vehicle body 2 in a place which is other than a manufacturing place. The assembling method and assembling management method of the present embodiment are suitably applied to the electric vehicle including the vehicle body 2 which can be easily moved with hands so that an operation burden in the mounting place is reduced, for example, straddle-type vehicle. The straddle-type electric vehicle is not limited to the electric motorcycle, and may be an electric three-wheeled vehicle, an electric ATV (all-terrain vehicle), etc.

INDUSTRIAL APPLICABILITY

The present invention can easily perform stock management of an electric vehicle, can be widely used in electric vehicles, and is effectively applied especially to a straddle-type electric vehicle with a small size and a light weight.

REFERENCE CHARACTER LIST 1 electric motorcycle
2 vehicle body
3 battery unit
11 vehicle body frame
12 electric motor
13 front wheel
14 rear wheel
61 battery
101 electric power supply unit
110 mounting place
112 vehicle body test place
115 vehicle body storage area
165 battery storage room
224 manufacturing identification information
234 manufacturing identification information

The invention claimed is:

1. An assembling method of an electric vehicle in which a battery as an electric power supply for an electric motor which generates a driving power transmitted to wheels is mounted to a vehicle body including a frame, the wheels, and the electric motor, the assembling method comprising steps of:
assembling the vehicle body;
conducting a vehicle body test including confirmation of a state of driving power transmission from the electric motor to the wheels by connecting an electric power supply unit installed in a vehicle body test place to the electric motor of the vehicle body and supplying electric power from the electric power supply unit to the electric motor;
detaching the electric power supply unit from the electric motor and transporting the vehicle body which has passed the vehicle body test from the vehicle body test place to a mounting place, in a state in which the battery is not mounted to the vehicle body; and
mounting the battery to the transported vehicle body, in the mounting place.

2. The assembling method of the electric vehicle according to claim 1, comprising a step of storing the battery and the vehicle body to which the battery is not mounted, for a period that passes until the vehicle body is transported from the vehicle body test place to the mounting place, in the step of transporting the vehicle body;
wherein in the step of storing the battery and the vehicle body, the battery and the vehicle body are stored separately, and a temperature of the battery is controlled more accurately than a temperature of a vehicle body storage area in which the vehicle body is stored is controlled.

3. The assembling method of the electric vehicle according to claim 2,
wherein in the step of storing the battery and the vehicle body, the battery is re-charged or tested.

4. The assembling method of the electric vehicle according to claim 3,
wherein in the step of mounting the battery to the transported vehicle body, the battery which is re-charged or has a good test result in the step of storing the battery and the vehicle body, is mounted to the vehicle body.

5. The assembling method of the electric vehicle according to claim 1,
wherein in the step of mounting the battery to the transported vehicle body, it is determined whether or not the battery is permitted to be mounted to the vehicle body, based on vehicle body identification information provided to the vehicle body and battery identification information provided to the battery, according to a predetermined rule.

6. The assembling method of the electric vehicle according to claim 1, comprising a step of detecting a state of the battery before the step of mounting the battery to the transported vehicle body,
wherein in the step of mounting the battery to the transported vehicle body, it is determined whether or not the battery is permitted to be mounted to the vehicle body, based on a result of detection in the step of detecting the state of the battery.

7. The assembling method of the electric vehicle according to claim 1,
wherein the step of mounting the battery to the transported vehicle body is performed in a place which is closer to a location where the electric vehicle is provided to a user, than the vehicle body test place is.

8. The assembling method of the electric vehicle according to claim 1,
wherein the electric vehicle is a straddle-type vehicle.

9. An assembling management method of an electric vehicle in which a battery as an electric power supply for an electric motor which generates a driving power transmitted to wheels is mounted to a vehicle body including a frame, the wheels, and the electric motor, the assembling management method comprising steps of:
assembling the vehicle body;
conducting a vehicle body test including confirmation of a state of driving power transmission from the electric motor to the wheels by connecting an electric power supply unit installed in a vehicle body test place to the electric motor of the vehicle body and supplying electric power from the electric power supply unit to the electric motor; and
detaching the electric power supply unit from the electric motor and transporting the vehicle body which has passed the vehicle body test from the vehicle body test place, in a state in which the battery is not mounted to the vehicle body.

10. The assembling management method of the electric vehicle according to claim 9, comprising a step of storing the battery and the vehicle body transported in the step of transporting the vehicle body;
wherein in the step of storing the battery and the vehicle body, the battery is stored in a battery storage room isolated from a vehicle body storage area in which the vehicle body is stored, and a temperature of the battery storage room is adjusted to fall into a predetermined range.

11. The assembling management method of the electric vehicle according to claim 9, comprising a step of storing the battery and the vehicle body transported in the step of transporting the vehicle body;
wherein in the step of storing the battery and the vehicle body, the battery is re-charged or tested.

12. An assembling management method of an electric vehicle in which a battery as an electric power supply for an electric motor which generates a driving power transmitted to wheels is mounted to a vehicle body including a frame, the wheels, and the electric motor, the assembling management method comprising steps of:
preparing the vehicle body which has passed a vehicle body test conducted in a state in which the battery is not mounted to the vehicle body;
preparing the battery;
storing the battery and the vehicle body for at least a portion of a stand-by period that passes until the battery is mounted to the vehicle body; and
transferring the battery and the vehicle body to a place where the battery is mounted to the vehicle body, after the step of storing the battery and the vehicle body;
wherein in the step of storing the battery and the vehicle body, the battery is stored in a battery storage room isolated from a vehicle body storage area in which the vehicle body is stored, and a temperature of the battery storage room is adjusted to fall into a predetermined range.

13. The assembling method of the electric vehicle according to claim 1,
wherein the vehicle body transported to the mounting place in the step of transporting the vehicle body meets in the mounting place the battery having been prepared separately from the vehicle body and transported to the mounting place.

14. The assembling method of the electric vehicle according to claim 1,
wherein in the step of transporting the vehicle body, the vehicle body is transported by a transportation unit which is different from a transportation unit for transporting the battery.

15. The assembling method of the electric vehicle according to claim 1,
wherein the mounting place is a place where the electric vehicle is provided to a user, or a place where the electric vehicle is maintained.

16. The assembling method of the electric vehicle according to claim 1, further comprising the step of assembling the battery;
wherein plural kinds of vehicle bodies are assembled in the step of assembling the vehicle body, and the battery common to the plural kinds of vehicle bodies is assembled in the step assembling the battery.

17. The assembling method of the electric vehicle according to claim 1,
wherein the vehicle body is transported overseas to the mounting place in the step of transporting the vehicle body, and the battery is mounted to the vehicle body in the mounting place in the step of mounting the battery to the vehicle body.

* * * * *